(12) United States Patent
Molla

(10) Patent No.: US 9,733,724 B2
(45) Date of Patent: Aug. 15, 2017

(54) PHONETIC KEYBOARDS

(71) Applicant: Aberra Molla, Brighton, CO (US)

(72) Inventor: Aberra Molla, Brighton, CO (US)

( * ) Notice: Subject to any disclaimer, the term of this patent is extended or adjusted under 35 U.S.C. 154(b) by 0 days.

(21) Appl. No.: 14/679,905

(22) Filed: Apr. 6, 2015

(65) Prior Publication Data

US 2015/0212592 A1 Jul. 30, 2015

Related U.S. Application Data

(63) Continuation-in-part of application No. 12/271,650, filed on Nov. 14, 2008, now Pat. No. 9,000,957.

(60) Provisional application No. 61/020,729, filed on Jan. 13, 2008, provisional application No. 62/004,170, filed on May 28, 2014, provisional application No. 62/044,246, filed on Aug. 31, 2014, provisional application No. 62/080,316, filed on Nov. 15, 2014, provisional application No. 62/104,222, filed on Jan. 16, 2015.

(51) Int. Cl.
*G06F 3/023* (2006.01)
*G06F 3/0488* (2013.01)
*G06F 3/01* (2006.01)

(52) U.S. Cl.
CPC ............ *G06F 3/0237* (2013.01); *G06F 3/018* (2013.01); *G06F 3/0235* (2013.01); *G06F 3/04886* (2013.01)

(58) Field of Classification Search
CPC ..... G06F 2203/041; G06F 2203/04103; G06F 2203/04107; G06F 3/041; G06F 3/047; G06F 3/018; G06F 3/0235; G06F 3/0237; G06F 3/04886; Y10T 29/49124

USPC .................................................. 345/168–173
See application file for complete search history.

(56) References Cited

U.S. PATENT DOCUMENTS

| | | | |
|---|---|---|---|
| 4,694,280 A | 9/1987 | Rollhaus et al. | |
| 4,891,786 A * | 1/1990 | Goldwasser | B41J 3/26 341/29 |
| 5,339,358 A | 8/1994 | Danish et al. | |
| 6,054,941 A | 4/2000 | Chen | |
| 6,130,628 A | 10/2000 | Schneider-Humfschmidt et al. | |
| 6,378,234 B1 | 4/2002 | Luo | |
| 6,430,314 B1 * | 8/2002 | Ko | G06F 3/018 341/28 |
| 6,559,778 B1 | 5/2003 | Hillmering | |
| 6,753,794 B1 | 6/2004 | Adams | |
| 6,765,556 B2 | 7/2004 | Kandogan et al. | |

(Continued)

OTHER PUBLICATIONS

"AmharicDictionary.com," SelamSoft Inc., 2008, retrieved from http://www.amharicdictionary.com, retrieved on Oct. 2, 2008, 1 page.

(Continued)

*Primary Examiner* — Tony Davis
(74) *Attorney, Agent, or Firm* — Sheridan Ross P.C.

(57) ABSTRACT

The present invention is directed to a system and method for typing phonetic characters using two keystrokes. An aspect of the invention relates to the rendering of characters is based on the timing between a first and second keystroke if a second modifying keystroke is used, or based on a first keystroke. The method may be used on computer devices, cellular devices, other devices (including, but not limited to tablets), and other abbreviated and non-abbreviated keyboards, whether actual or virtual.

20 Claims, 16 Drawing Sheets

(56) References Cited

U.S. PATENT DOCUMENTS

| | | | | |
|---|---|---|---|---|
| 6,822,585 B1* | 11/2004 | Ni | | G06F 3/0237 341/22 |
| 7,015,896 B2* | 3/2006 | Levy | | G06F 3/0235 345/168 |
| 7,170,430 B2 | 1/2007 | Goodgoll | | |
| 9,000,957 B2* | 4/2015 | Molla | | G06F 3/018 341/20 |
| 2002/0070923 A1* | 6/2002 | Levy | | G06F 3/0235 345/169 |
| 2004/0001734 A1* | 1/2004 | Burrell, IV | | G09B 21/003 400/472 |
| 2005/0027534 A1* | 2/2005 | Meurs | | G06K 9/723 704/270 |
| 2005/0182616 A1* | 8/2005 | Kotipalli | | G06F 17/2217 704/2 |
| 2006/0061556 A1* | 3/2006 | Yamane | | G06F 3/018 345/173 |
| 2006/0192765 A1* | 8/2006 | Lin | | G06F 3/018 345/171 |
| 2007/0005537 A1* | 1/2007 | Abdulkader | | G06K 9/00429 706/20 |
| 2007/0008287 A1* | 1/2007 | Lin | | G06F 3/018 345/168 |
| 2007/0016858 A1* | 1/2007 | Lee | | G06F 3/0233 715/262 |
| 2007/0288240 A1* | 12/2007 | Huang | | G10L 13/033 704/260 |
| 2008/0215307 A1* | 9/2008 | Li | | G06F 17/2863 704/3 |
| 2008/0215308 A1* | 9/2008 | Li | | G06F 3/04883 704/3 |
| 2008/0270111 A1* | 10/2008 | Hanumanthappa | | G06F 17/2223 704/3 |
| 2009/0132231 A1* | 5/2009 | O'Dell | | G06F 3/018 704/2 |
| 2009/0179778 A1* | 7/2009 | Molla | | G06F 3/018 341/22 |

OTHER PUBLICATIONS

"Ethiopic Computerization," Ethiopic, 2006, retrieved from https://archive.is/LWaLI, retrieved on Nov. 4, 2015, 2 pages.

"Gate2Home—Ethiopic Keyboard," retrieved from http://gate2home.com/Ethiopic-Keyboard, retrieved on Nov. 4, 2015, 2 pages.

"GeezEdit 2.0," Ethiopian Computers & Software, 2009, retrieved from http://www.ethiopic.com/, 14 pages.

"Lexilogos multilingual keyboard," retrieved from http://wvvw.lexilogos.com/keyboard/amharic.htm, retrieved on Nov. 3, 2015, 2 pages.

"Type_Unicode_Ge'ez (Amharic) Online," GF Zemen by Ge'ez Frontier Foundation, retrieved from www.ethiopianreview.com/ethiopia/amharic.html, retrieved on Oct. 1, 2008, 3 pages.

Alamnhe, "Washra 4.0," Senamirmir Project, 2006, pp. 1-12.

Alamnhe, "Washra 4.1," Senamirmir Project, 2008, pp. 1-12.

Molla, "Advances Made by Ethiopians in the Computer Technology (1991)," Ethiopian Computers & Software, 1991, retrieved from https://www.facebook.com/notes/403555123037729/, 4 pages.

Molla, "Engineer Ayana Birru", Ethiopian Computers and Software, 2007, retrieved from http://www.ethipic.com/Ayana_Birru.htm, retrieved on Nov. 29, 2007, pp. 1-6.

Yacob et al., "System for Ethiopic Representation in ASCII (SERA)," Indiana University, retrieved from http://www.ethiopians.com/yitna.html, retrieved on Nov. 4, 2015, 9 pages.

Official Action for U.S. Appl. No. 12/271,650, mailed Mar. 2, 2012, 8 pages.

Final Action for U.S. Appl. No. 12/271,650, mailed Oct. 16, 2012.

Official Action for U.S. Appl. No. 12/271,650, mailed Aug. 14, 2014, 8 pages.

Notice of Allowance for U.S. Appl. No. 12/271,650, mailed Dec. 2, 2014, 7 pages.

* cited by examiner

| Key | E | e' | eu | ei | ea | ee | e | eo |
|---|---|---|---|---|---|---|---|---|
| Code | 4832 | 4837 | 4833 | 4834 | 4835 | 4836 | 4837 | 4838 |
| Glyph | | | | | | | | |
| | | | | | | | | |
| Key | e1 | | e3 | e4 | e5 | e6 | | |
| Code | 4800 | | 4802 | 4803 | 4804 | 4805 | | |
| Glyph | | | | | | | | |
| | | | | | | | | |
| Key | 1e | 2e | 3e | 4e | 5e | 6e | 7e | |
| Code | 11696 | 11697 | 11698 | 11699 | 11700 | 11701 | 11702 | |
| Glyph | | | | | | | | |

English Typing qq ww ee rr tt yy uu ii oo pp
aa ss dd ff gg hh jj kk ll
zz xx cc vv bb nn mm ,, ..

Result
1 2 3 4 5 6 7 8 9 0
! @ # $ % & * ?
_ " ' ( ) - + ; :

Typing and Result
q, w, e, r, t, y, u, i, o, p,
€¥£~=\^[]¿
a, s, d, f, g, h,
` {}<>|

Typing and Result
q. w. e. r. t. y. u. i. o. p.
€¥£~=\^[]¿
a. s. d. f. g. h.
` {}<>|

FIG. 22

| 1 | 2 | 3 | 4 | 5 | 6 | 7 | 8 | 9 | 0 |
|---|---|---|---|---|---|---|---|---|---|
| Tab | ቀ | መ | ሸ | ር | ትፕ | ይ+ | ⁄ | ጽ | ፐኋ |
| Shift+ | እ | ስ+ | ድ | ፍ | ግ | ህ+ | ጅቅ | ከ | ኣ+ |
| ,12 | ዝ | ዉ | ች | ቭ | ብቭ | ኝኝ | ም+ | ዕኝ | Enter |
| Globe | ፕ | Meen | Mic | | Space Bar | | ኀ | ሕ | Remove Keyboard |

# PHONETIC KEYBOARDS

CROSS REFERENCE TO RELATED APPLICATIONS

The present application is a Continuation-in-Part of U.S. patent application Ser. No. 12/271,650, filed on Nov. 14, 2008, which claims the benefit of U.S. Provisional Patent Application No. 61/020,729 filed Jan. 13, 2008. This application claims the benefit of U.S. Provisional Patent Application No. 62/004,170, filed May 28, 2014, and U.S. Provisional Patent Application No. 62/044,246, filed on Aug. 31, 2014, and U.S. Provisional Patent Application No. 62/080,316, filed on Nov. 15, 2014, and U.S. Provisional Patent Application No. 62/104,222, filed on Jan. 16, 2015. All of these applications are hereby incorporated by reference in their entirety.

FIELD OF THE INVENTION

The present invention relates to a method to type phonetic languages utilizing an English keyboard, a QWERTY keyboard, a keyboard with less or more keys available physically or virtually on cell phones, tablets or computers, or an abbreviated keyboard. The method provides for the phonetic language to be typed with three or fewer keystrokes.

BACKGROUND

The present invention is directed to the use of computers in writing Geez or Ethiopic, which is the alphabet on which Ethiopian writing is based. Ethiopic or Geez is one of the world's most ancient alphabets and languages. According to the beliefs of the Ethiopian Orthodox church, Ethiopic has a special place in biblical history. The first human to use the alphabet is believed to be Henoch of the Old Testament. Henoch, the Seventh in line from Adam and Eve and the great grandfather of Noah supposedly wrote the Book of Enoch in Ethiopic. Ethiopic is an ebugida meaning that each symbol represents a consonant and vowel combination. The symbols are organized into classes and orders of similar symbols, which are associated with similar sounds. The symbols are organized on the basis of both the consonant and the vowel. Ethiopic is written left to right across the page. These Ethiopic characters have evolved over time from more ancient forms.

There is archeological evidence that the proto-Ethiopic alphabet existed before the $9^{th}$ century BC especially during the D'mt Kingdom in Northern Ethiopia. The ancient character set existed as the Heleheme series having only a first order. The first and last syllographs of Geez, "He" and "Pe" are relatively the same in Ancient Egypt as the first and last main Hieroglyphs. The order of the Geez system has remained the same for roughly 3000 years. Some believe that the first character set was an ebugida. Others even claim that the classic Ethiopic with its seven vowel expansions was in existence before 3000 BC. Still others claim that Ethiopic is a Sabean alphabet. It is thought by some that it was during the Axumite Kingdom of around 340 AD that the alphabet gained the vowel forms and started to be written from left to right.

Translation of Bible books into Ethiopic, the ancient Semitic language, contributed to the development of the syllabic alphabet. Gradually, the Geez language started to die out and now remains as a liturgical language of the Ethiopian Orthodox Church. Around the 13.sup.th century AD, Amharic became the dominant language. As a result, more characters were added to Geez primarily through the influence of the Hamitic languages. In the 1800's the Bible was translated to Amharic and later to Tigrigna and Oromo languages. Since then Ethiopic has added more characters as more languages began using it.

The introduction of the printing press around 1900 encouraged the proliferation of books. Books and newspapers were printed using type-setting technology. Type-setting provided a fairly faithful reproduction of the Ethiopic characters, which prior to the introduction of the printing press, were written by hand. Around 1920 Ayana Birru introduced the Amharic typewriter, which consisted of a modification of the print head of the familiar English typewriter. While the Amharic typewriter allowed for a widespread production of printed documents, it was not without drawbacks. In particular, using the Amharic typewriter, glyphs were produced by a complicated series of the partial glyphs successively typed over the top of each other. The glyphs thus produced were merely an approximation of the true hand-written Ethiopic characters, which were more faithfully reproduced by a printing press. Thus, despite its utility, the Amharic typewriter, led to the proliferation of sub-standard characters and incomplete Amharic sets.

With the advent of computer technology, it became possible to efficiently produce printed documents having Ethiopic characters without the use of a printing press. Early attempts at adopting computer technology for this purpose, did not use the true Ethiopic characters, but instead used glyphs similar to those produced by the Amharic typewriter. Accordingly, the full range and variety of Ethiopic characters were not expressed.

With improvements to computer technology, it became possible to more faithfully render the true Ethiopic characters. While the problem of rendering true characters had been solved, the problem remained of specifying all the characters using the standard QWERTY keyboard or on an abbreviated keyboard, which may be used in for a cell phone or tablet device for example. In particular, Ethiopic has approximately 564 characters, all of which cannot be typed using a standard keyboard, which has far fewer keys. Several schemes have been developed to address this problem. All the schemes developed so far are complicated and non-intuitive and require many keystrokes per character. Accordingly it would be desirable to have an improved system for entering Ethiopic characters into a computer using a standard QWERTY keyboard or other abbreviated or expanded keyboard.

With the globalization of the world economy and with the ease of communication due to the internet, people are able to communicate throughout the world. Some languages, for example Ethiopic, utilize a phonetic set of characters. The characters in Ethiopic are related to each other. For example, the Ethiopic character for the sound "Ha" is "ሃ", while the Ethiopic character for "Ho" is "ሆ", which is a slight variation. Other languages utilize a similar character phonetic system where, for example, a consonant, a vowel or a combination of a consonant and a vowel are represented by a set of characters.

An example of current problem with typing Ethiopic that has been there online, for example www.lexilogos.com/keyboard/amharic.htm. At the site, one cannot type some words. For example, words like "ትዝታ" typed with "tzta" on the lexilogos website. The "tz" spelling combination relates to an Ethiopic "ፀ" character and inserting the "ፀ" with a mouse from the list of Ethiopic glyphs on the page is equally useless as any "tz" becomes "ፀ".

Another example of current problem with typing Ethiopic is available at www.amharicdictionary.com. While using this website, the word "teegsst" which is "ትዕግሥት" illustrates an example where there is interference in the method. When the "t" and the "e" characters are entered a different character shows up where the character for the "ee" character "ö" has been mapped. In order to type the "ት" character, which is the character for the sound "t" using this website, one would start by entering the "t" keystroke, which renders the "ት" character. The next character happens to be a vowel sound mapped to the "ee" position. When the user presses "e" in hopes of getting the "ö" character, it does not appear. Instead, the first character, "ት", is replaced with "ተ" and the second "e" generates the "ለ". This first character manipulation is caused by the mapping of the keys and the typing method. There is nothing to tell the program to not change the first character and render a second character without entering a stop key, such as the space bar. However, when the user presses the space bar, a space appears between the first character and the second character. The website recommends that the word "ትዕግሥት" or similar words are typed with a space between the "ት" and the "ö". The user then must go back and remove the extra space. This method requires at least four keystrokes in order to render two characters.

Another example is the Gate2Home website available at gate2home.com/Ethiopic-Keyboard. Here to write the same word "teegsst" in Ethiopic "ትዕግሥት", a user would first hit the "t" character and the program renders the appropriate character "ት", only this time, the character is highlighted. If the user now enters the keystroke "o", the highlighted character "ት" changes to "ቶ" instead of rendering the desired character "ö". If the users want to move on to the next character, they must remove the highlighting on the character by either using a mouse or by using the arrow key. Thus, this method also requires at least four keystrokes in order to type two characters (one to render the first character, second keystroke to remove the highlighting, third keystroke to render second character, and fourth keystroke to remove highlighting).

Another example of a prior art method is illustrated in the Amharic Wikipedia website available at am.wikipedia.org/wiki/. It is believed that this website uses the System for Ethiopic Representation in ASCII (SERA) to spell out Ethiopic characters with English characters. This webpage illustrates the issue that characters are not settled, even after a period of time. For example, if the character "ር" is present on the screen and an editor goes next to space adjacent to that character and presses the "a" letter, the character "ር" changes to "ራ". This change is because the SERA program does not settle the first character. Rather, it is always available to change to other order character using a second keystroke. Thus, the document is never complete and remains in limbo indefinitely.

Thus, a need exists to render a phonetic character using few keystrokes and settling the characters on a document so that they cannot be manipulated over a period of time.

SUMMARY

The present invention is directed to a system and method for typing Ethiopic characters in a computer, cell phone, tablet or other system using at most three keystrokes, but in many embodiments only two keystrokes. The rendering of a character is based on the principle of rendering variable default characters with one keystroke. A second character may be rendered by first rendering a first character, then changing the first character to a second character with a second keystroke that is rendered within a timed period. A character may also be generated with two or more keystrokes and the timing that affects subsequent keystrokes may involve more than one timing period. Conventional symbol typing may be preserved by a prioritized assignment of the symbols to alternative shift keys. A timing disable key or keys may be defined that allows typing of default characters at a comfortable speed, which may be set by the user. The system may be useful for alphabets such as English, Ethiopic, or the other phonetic alphabets or languages. While multiple languages could have been chosen for an example of the problem with typing phonetic languages, Ethiopic is used as an example throughout the specification.

An aspect of the invention, which describes a method to render an Ethiopic character using a single keystroke plus a modifier key is described in U.S. Patent Publication No. 2009/0179778 ("the '778 Publication"), the entire disclosure is incorporated by reference herein in its entirety. This method described in the '778 Publication involves 47 default characters and the characters in the shifted positions. The method uses a timer system where a character is rendered in response to a first keystroke, and starts a timer. If a second keystroke is not entered within the time period of the timer, the first character settles (i.e. cannot be changed). If a keystroke is entered within the time period of the timer, the first character is replaced with a second character. The typing of one character per keystroke allows 47 characters to be rendered, and the use of a single secondary key within the timer only allows for an additional 47 characters. Unfortunately, this is not enough to accommodate for the Ethiopic characters and there is a need to increase the number of characters to generate with as little keystrokes as possible. The method allows for up to hundreds of the Ethiopic characters to be accommodated on or accessed from one keyboard (understanding that virtual keyboards allow for a variable number of keys).

The same principles for one and two keystrokes apply when single characters are rendered in combination with others, for example the shift key, to generate a character. These characters could be settled or changed to a different character with a third keystroke. It should also be understood that the problems associated with one and two keystrokes are repeated with two and three keystrokes in the above websites. This is because some characters are initially generated with the superimposed shift key and are also unstable glyphs further modified with third and fourth keystrokes. For instance, at the Amharic Dictionary page "ኡኡ" can't be typed with "shift u shift u" as the combination of those four keystrokes renders one "ዐ" character. At Amharic Wiki, "ኟ" is rendered with six keystrokes. Thus, the typing method of the invention allows for the rendering of a phonetic language with the least possible keystrokes, thereby increasing efficiency.

BRIEF DESCRIPTION OF THE DRAWINGS

FIG. 7 is another illustration of keystroke pairs, in accordance with embodiments of the present invention;

FIG. 8 is another illustration of keystroke pairs, in accordance with embodiments of the present invention;

FIG. 11 is the Ethiopic Unicode character set;

FIG. 20 illustrates exemplary keystrokes using vowels, symbols, numbers, and modifier keys;

FIG. 21 illustrates ten rows of characters and eleven columns of characters on an exemplary keyboard;

FIG. 22 illustrates exemplary typing using the present invention;

DETAILED DESCRIPTION

Figure 1:
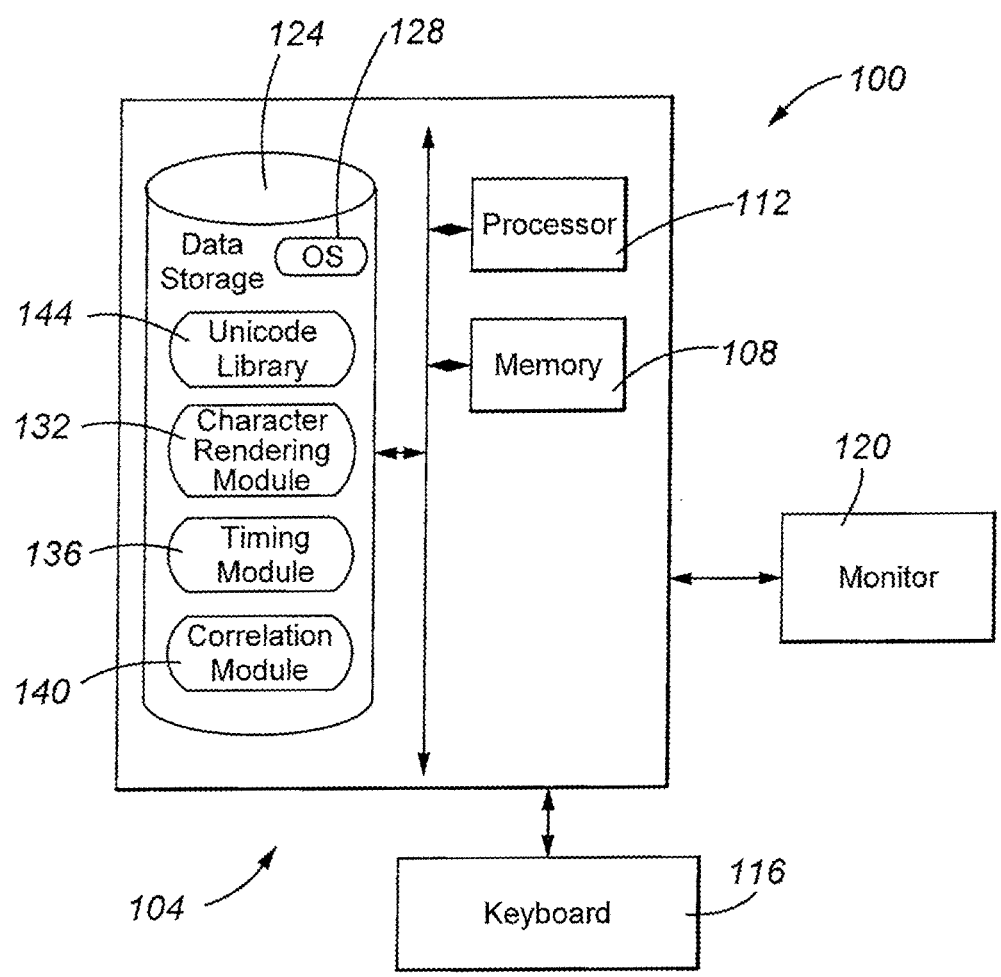
FIG. 1 is an illustration of system in accordance with embodiments of the present invention.

The present invention is directed to a system and method for entering phonetic characters in a computational device using at most two keystrokes. For example, embodiments of the present invention are used to enter Ethiopic characters. The system 100 may include a computational device, such as a personal computer, identified in FIG. 1 with reference numeral 104. A computational device 104 may include memory 108 for use in connection with the execution of programming by a processor 112 and for the temporary or long-term storage of data or program instructions. The memory 108 may comprise solid-state memory resident, removable or remote in nature, such as DRAM and SDRAM. Where the processor 112 comprises a controller, the memory 108 may be integral to the processor 112.

In addition, various user input devices and user output devices may be provided. By way of illustration and not limitation, the computational device 104 shown in FIG. 1 includes a keyboard 116 input device and a monitor or display 120 output device. Other examples of input devices, which may be used in connection with the computational device 104 include a numeric keypad, a microphone and pointing device or other position encoder combined with a monitor, or touch screen. Examples of other user output devices, which may be used in connection with the computational device 104 include an alphanumeric display, ringer, printer port, speaker or indicator lights.

Figure 2:
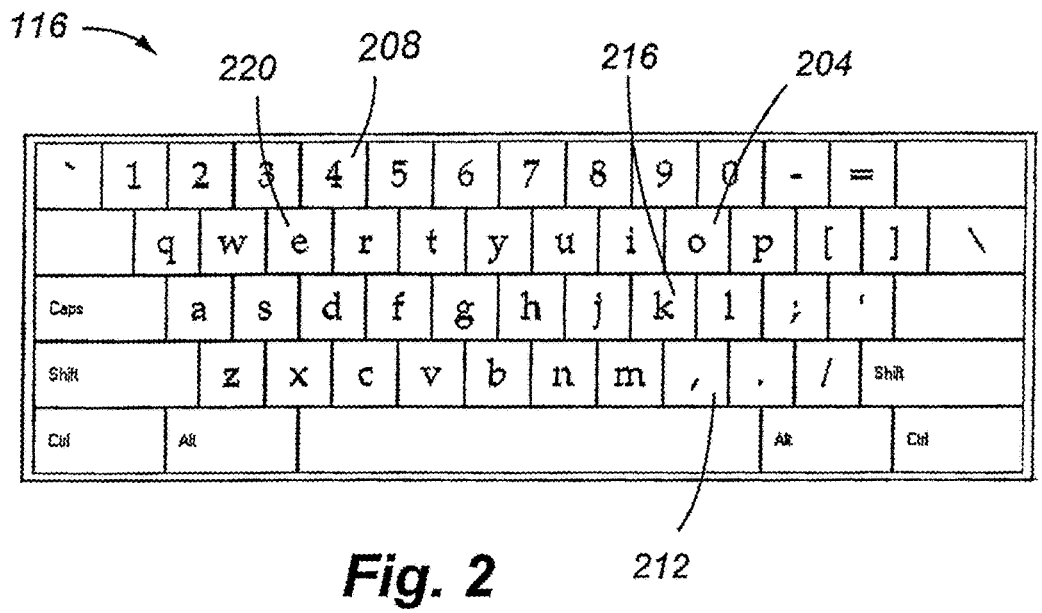
FIG. 2 is an illustration of a default QWERTY keyboard as known in the prior art.

FIG. 2 shows a detailed illustration of a keyboard 116, which may be used in connection with the present invention. As can be seen, the keyboard 116 is a standard QWERTY keyboard having character keys including letter keys 204, number keys 208 and symbol keys 212. As is known, typing a particular character includes pressing or striking a particular key, referred to herein as a keystroke. In response to a keystroke, a particular character is rendered on the monitor 120. As used herein "rendering" refers to at least displaying a character on the monitor 120, and may additionally include storing or saving the character in a buffer, document and/or file. The standard QWERTY keyboard may be used in the familiar way to render Latin letters and Arabic numerals or, in accordance with embodiments of the present invention, to render Ethiopic characters. A character (Ethiopic or other) is rendered on the monitor 120 based on a mapping between the key that was pressed or struck and the rendered character. This mapping may be performed by referencing a table stored in memory 108 or data storage 124. In rendering the Latin letters or Arabic numbers, the rendered character corresponds to a character printed on the struck key. In rendering an Ethiopic character, the rendered character does not correspond to a character printed on the struck key. It is also noted that for the QWERTY keyboard used in the conventional way, two characters may be mapped to the same key, wherein one of the characters is typed using the shift key. This is the case with the number keys 208 and the symbol keys 212, which include a "shifted" character and a "non-shifted" character. Moreover, the shifted characters associated with letter keys 204 correspond to the capital or upper case letters. As is known, rendering a shifted character includes pressing the key while holding down the shift key.

Referring again to FIG. 1, a computational device may also include data storage 124 for the storage of application programming modules and/or data. For example, operating system software 128 may be stored in the data storage 124. An example of a module that may be stored in data storage 124, is a character rendering module 132. As can be appreciated by one of skill in the art, a character rendering module 132 may comprise instructions for receiving user input and, in response, displaying user output. More particularly, the character rendering module 132 may be operable to receive keystroke input from the keyboard 116 and, in response, render a corresponding character on the monitor 120. A character rendering module 132 in accordance with embodiments of the present invention is operable to map the keystrokes received from a standard QWERTY keyboard 116 to a complete set of phonetic characters. In this regard, the character rendering module 132 may be used in connection with a phonetic language, such as Ethiopic, having a number of characters greatly exceeding the number of keys which are present on a standard QWERTY keyboard 116.

The character rendering module 132 achieves the mapping between QWERTY keyboard 116 input and a complete phonetic character set, in part, by measuring the timing between keystrokes. In this regard, the character rendering module 132 may be provided in association with a timing module 136. The timing module 136 may include a counter that is enabled when the data from the first keystroke is latched, and disabled when the data from the second keystroke is latched. The counter may be correlated or otherwise calibrated to a system clock or other real-time element to enable the timing between keystrokes to be measured in real-time units such as, seconds or milliseconds. The measurement of time between first and second keystrokes is used to determine if two successive keystrokes occur within a predetermined time interval. If so, the two keystrokes may be considered by the character rendering module 136 to be a combined keystroke. As used herein, a combined keystroke refers to a first and second keystroke that are grouped together for the purpose of typing a particular phonetic character. If not, the two keystrokes are considered to be two independent keystrokes that are unrelated to each other. In accordance with embodiments of the present invention, the predetermined interval may be adjusted by a user or an administrator.

Whether or not two successive keystrokes that occur within the predetermined time interval are considered to be a combined keystroke can also depend upon whether the first and second keystroke are one of a number of predetermined keystroke pairs. In this regard, the character rendering module 132 may be additionally provided in association with a correlation module 140, which is operable to determine if the first keystroke and the second keystroke are one of a number of predetermined keystroke pairs. Typically, a particular key will be paired to a number of other keys. The number of keys to which a particular key is paired will typically be less than the total number of keys on the keyboard. For example, as is the case with an embodiment of the invention described below, a particular key may paired with the vowel keys, the number keys and most of the symbol keys, and not paired with the remaining keys (i.e. the consonant keys, the number pad keys and the remaining symbol keys).

In operation, the correlation module 140 will assert a signal of affirmative correlation if both the first and second keystroke occur within a predetermined time interval and the first and second keystroke are one of a number of predetermined key pairs. If both of these conditions do not occur the correlation module 140 will assert a signal of non-affirmative correlation. More particularly, if the first and second keystroke do not occur within a predetermined time interval or the first and second keystroke are not one of a number of predetermined keystroke pairs, the correlation module 140 will assert a signal of non-affirmative correlation. A signal of affirmative correlation indicates, to the character rendering module 132, that the first and second keystrokes are to be considered a combined keystroke. Similarly, a signal of non-affirmative correlation indicates, to the character rendering module 132, that the first and second keystrokes are to be considered two independent keystrokes, which are unrelated to each other. It should be appreciated that the character rendering module 132, the timing module 136 and the correlation module 140 may be implemented as discrete elements or implemented together as elements of a combined software application.

By considering two successive keystrokes to be a combined keystroke, the second keystroke is considered to be a modifier or order specifier of the first key. This arrangement is particularly advantageous in mapping from a QWERTY keyboard 116 input to Ethiopic characters, which include groupings of characters that are related phonetically. In particular, speech sounds such as "ka", "ku", "ke", etc., which have a common consonant and a differing vowel, are represented in Ethiopic with a group of characters having a similar appearance. Each character within a group (or series) is said to belong to a particular character order. Rendering particular orders within the group requires a combined keystroke, such as, for example, "k" followed by a second keystroke that occurs within a predetermined time interval and is paired to the "k" key. As mentioned above, the vowel keys are typically paired to each key. Accordingly, if "a", "e", "i", "o" or "u" is received as the second keystroke within the predetermined time interval after the "k" first keystroke is received, a combined keystroke will result. Depending on which vowel key is received as the second keystroke, a particular Ethiopic character belonging to a particular order will be rendered. As the Ethiopic characters are themselves naturally grouped as vowel expansions, pairing keys to the vowel keys provides an advantageous and intuitive mapping for at least those who are familiar with both the Ethiopic and Latin characters. However, the number of possible vowel sounds exceeds the number the vowel keys present on the QWERTY keyboard. For example, the "ä" vowel sound is not represented on the QWERTY keyboard. As a result, embodiments of the present invention may use particular symbol keys to represent additional vowel sounds. In particular, a "/" second keystroke that follows an "k" first keystroke within the predetermined time interval can be used to produce a combined keystroke, which will result in the rendering of a particular Ethiopic character of a particular order.

Figure 3:
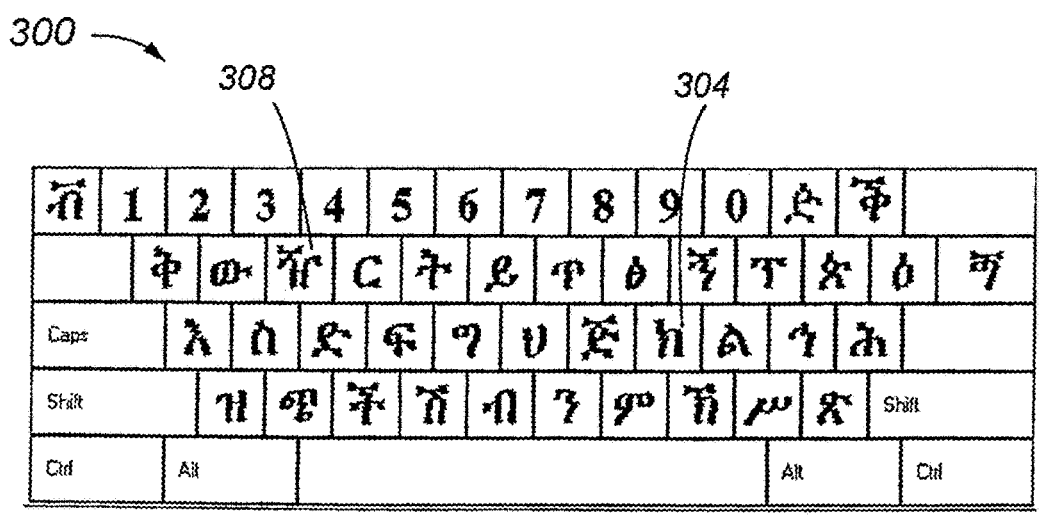
FIG. 3 is a default key assignment for Ethiopic characters on a standard keyboard, in accordance with embodiments of the present invention.

In accordance with embodiments of the present invention, one order (the sixth order) is designated as the default order. Displaying the default order within the character group requires only a first keystroke, such as, for example, "m". The default key assignment is shown in FIG. 3, with default Ethiopic characters overlaid on a standard keyboard. The default key assignment is determined based on the frequency of the characters as used in the Amharic language. The default key assignment 300 shown in FIG. 3 is thought to be an intuitive layout for a skilled Ethiopian typist, who will typically be familiar with similar key assignments. In particular, a skilled Ethiopian typist can be expected to reliably use a standard QWERTY keyboard having Latin letters to effectively type text in Ethiopic, provided that the key assignment like the one shown in FIG. 3 is maintained. It should be understood that the number of Ethiopic characters that can be typed or displayed using only the default keys of the present invention is limited and does not include the complete set of Ethiopic characters. The present invention uses computer technology to expand the capacity of a typist to include the ability to type the complete set of Ethiopic characters. The complete set of Ethiopic characters includes each complete vowel expansion as well as other characters.

In accordance with embodiments of the present invention, a "timing disable" key may be designated. When received within the predetermined time interval after a first keystroke, the timing disable key indicates that the default character associated with first keystroke should be displayed. In this way, a user can type at a comfortable speed without having to wait for the predetermined time interval to expire before typing the next character. A symbol key is typically designated as the timing disable key. When used to disable the timing mechanism, the symbol that is normally associated with the key is, of course, not displayed. In particular, a first keystroke is initially typed, followed by the timing disable key, typed within the predetermined time interval. As a result, the default character associated with the first keystroke is only displayed (and not the symbol normally associated with timing disable key). Thereafter, the user is free to continue typing without having to wait for the predetermined timing interval to expire.

FIGS. 4-8 show key assignments and ordered key pair assignments in accordance with embodiments of the present invention. The ordered key pair assignments operate as a mapping between QWERTY keyboard 116 input and corresponding characters to be rendered. As mentioned above, ordered keystroke pairs are used by the correlation module 140 to determine if a first and second keystroke are to be considered a combined keystroke. Accordingly, the keystroke pairs in FIGS. 4-8 reference a particular Ethiopic character that is rendered in response to the combined keystroke that includes the keystroke pair. The keys that are pressed or struck as the first and second keystrokes are referenced, in FIGS. 4-8, with the non-shifted symbols that appear on the keys in a QWERTY keyboard 116.

Figure 4:
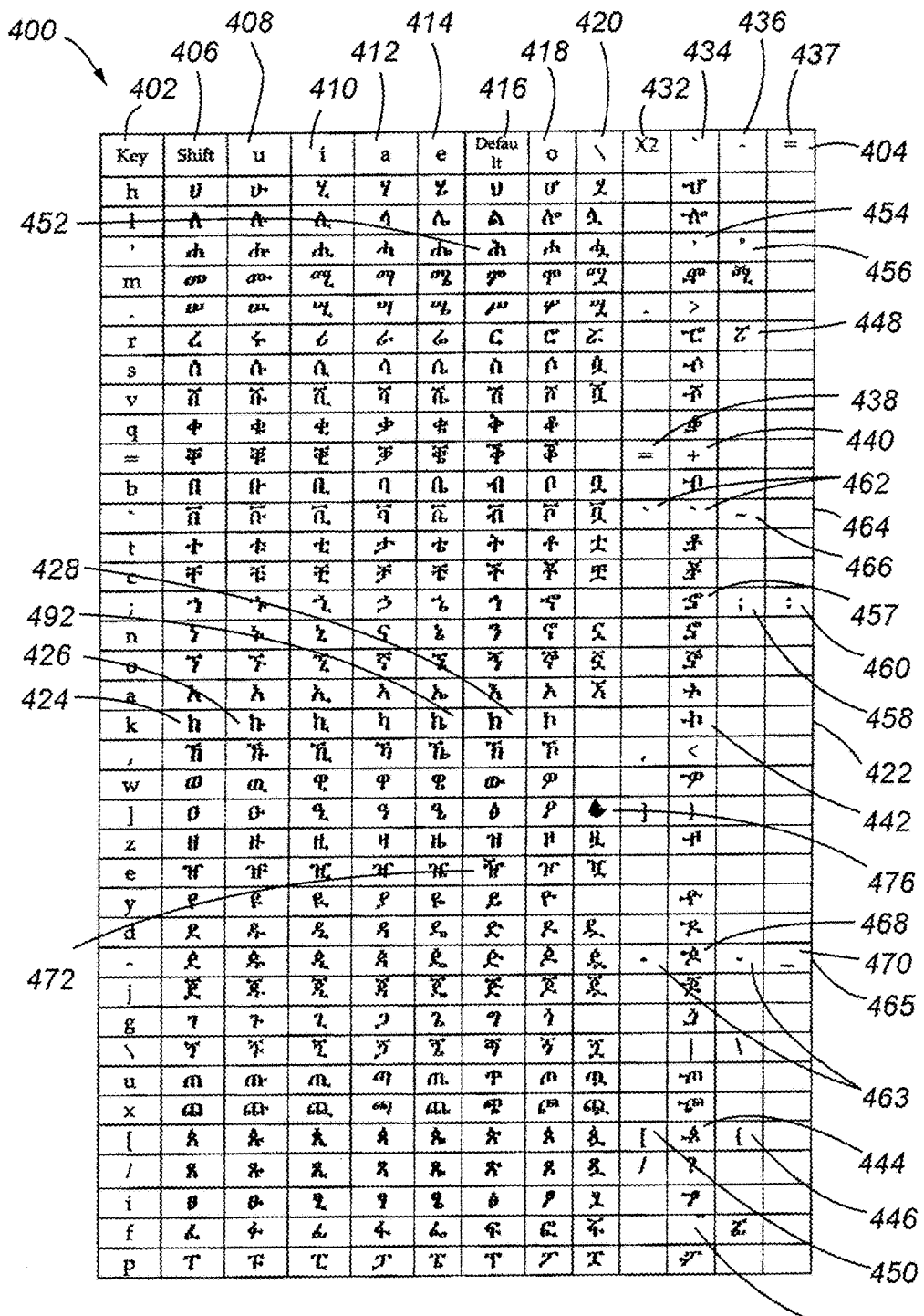
FIG. 4 is an illustration of keystroke pairs, in accordance with embodiments of the present invention.

Referring initially to FIG. 4, key pairs, which include characters of the Amharic alphabet are generally identified by reference numeral 400. Typically, the first keystroke of a given keystroke pair is shown in the left-most column, which is identified by the conventional symbol on the key and is generally associated with reference numeral 402. Typically, the second keystroke (or order specifier keystroke) of a given keystroke pair is shown in the top-most row and is generally identified with reference numeral 404. The top-most row 404 includes a number of keystroke indicators, beneath which are columns containing orders of Ethiopic characters. In particular, column 406 (beneath the "shift" second keystroke) includes the first order and unlike the other identified pairs, is selected by pressing the shift key when the first key 402 is struck. Column 408 (beneath the "u" second keystroke) includes the second order. Column 410 (beneath the "i" second keystroke) includes the third order. Column 412 (beneath the "a" second keystroke) includes the fourth order. Column 414 (beneath the "e" second keystroke) includes the fifth order. The top-most row 404 additionally provides a default key indicator, beneath which is a default character column 416.

The default character column 416 includes the sixth order. The characters listed in the default (or sixth) character column 416 are displayed if a first keystroke is received which is not correlated with a second key press within the predetermined time interval or if a first keystroke is followed by the timing disable key, as described above. Column 418 (beneath the "o" second keystroke) includes the seventh order. Column 420 (beneath the "V" second keystroke) includes the eighth order.

Beginning with the row beneath the top-most row 404, each row includes a group of related Ethiopic characters. For example, consider the row beginning with "k", which is generally identified by reference numeral 422. Row 422 includes an ordered expansion of related Ethiopic characters. In typing the first order characters, the shift key is held down while a key 402 in the left-most column is struck. For example, the first order character "KE" (as is cult) 424 may be rendered on the monitor if the "shift" key is held down, while the "k" key is struck. This is in contrast to the remaining orders of characters, which are typed by striking a first key from the left-most column 404 and a second key from the top-most row 408 within a predetermined time interval. For example, the second order character "KU" (as in cook) 426 will be rendered if a combined keystroke having "k" as the first keystroke and "u" as the second keystroke, is received within the predetermined time interval. The remaining orders may be displayed in a similar manner, noting however that the group of characters in row 422 does not include an eighth order character. Additionally, it is noted that the default 10 character 428 "K" (as in cake) may be rendered if only "k" is received as the first keystroke. Alternatively, the default character may be rendered by the use of the timing disable key, as described above.

As shown in FIG. 4, a particular first keystroke may be paired with a number of other second keystrokes that are not associated with an ordered expansion of characters. In this regard, FIG. 4 includes columns 432, 434, 436 and 437 that are located, respectively, beneath the "X2", """, "-" and "=" second keystrokes shown in row 404. The "X2" second keystroke (which is shown in the top-most row 404 and begins column 434) refers to the situation in which the key pressed as the first keystroke is pressed again as the second keystroke. Accordingly, in certain cases this "double-strike" combination of first and second keystrokes is considered a combined keystroke. As mentioned above, the standard QWERTY keyboard includes symbol keys 212. Some symbol keys 212 have two symbols (not letters and not numbers) per key, such as the key used to type the ";" character and the ":" character. Conventionally, the first symbol is typed with the symbol key, and the second symbol is typed using the symbol and the shift key. The symbol keys 212 on a QWERTY keyboard having two symbols (not letters and not numbers) are herein referred to as two-symbol symbol keys. In accordance with embodiments of the present invention, the double-strike combined keystroke may be used to preserve the standard functionality of the two-symbol symbol keys. In particular, as the two-symbol symbol keys on the standard QWERTY keyboard are assigned to Ethiopic characters, an arrangement or mapping is needed to allow a user to be able to type the standard symbols, if needed. Accordingly, in some cases, a user may type the two-symbol symbol key twice within a predetermined time interval to affect the typing of a particular symbol. For example, the mapping shown in FIG. 4 includes a "=" symbol character, which is identified by the reference numeral 438. The "=" symbol character 438 is typed by a combined keystroke, which includes a "=" first keystroke and a "=" second keystroke entered within the predetermined period after the first keystroke. Additionally, preserving the ability to type the symbols associated with two-symbol symbol keys in the present invention includes an arrangement or mapping for the second or shifted symbol. In that regard, the """ second keystroke (which is shown in the top-most row 404, and which begins column 434) may operate as a "shift" key. In particular, a user may type the shifted symbol with a combined keystroke, which includes the two-symbol symbol key as the first keystroke and the """ key as the second keystroke. For example, the ordered classic expansion key pair assignments shown in FIG. 4 include a "+" symbol character, which is identified by the reference numeral 440. The "+" symbol character 440 is typed by a combined keystroke, which includes a "=" first keystroke and a """ second keystroke.

In addition to functioning as a "shift" key, the """ second keystroke may also be used to display miscellaneous Ethiopic characters, which are not considered to be members of an ordered expansion of characters. For example, the character identified with reference numeral 442, shown in row 422, does not belong to an ordered expansion of characters. This character is displayed as a result of receiving a combined keystroke having a "k" first keystroke and a """ second keystroke. As can be seen, the character identified with reference numeral 442 has a significantly different appearance from the other characters in row 422 and is not a member of the ordered classic expansion.

It is noted that the """ key takes on two functions: first, as a second keystroke "shift" key for typing symbols; and second, as a second keystroke in typing miscellaneous Ethiopic characters. These two roles do not conflict if the first keystroke used to type the miscellaneous Ethiopic character is a letter key. (See, for example, the above description of the character identified with reference numeral 442). However, when the first keystroke used to type the miscellaneous Ethiopic character is a two-symbol symbol key, the two roles for the """ key cannot be maintained. For example, consider the character identified with reference numeral 444. This character is displayed as a result of receiving a combined keystroke having a "[" first keystroke and a """ second keystroke. As a result, the combined keystroke having a "[" first keystroke and a """ second keystroke is not available for typing the shifted symbol "{". Accordingly, an alternative key assignment is needed for the shifted symbol. In that regard, the "-" key may be used as a second keystroke (which is shown in the top-most row 404, and which begins column 436) and may operate as an alternative "shift" key. In particular, a user may type a shifted symbol with a combined keystroke, which includes the two-symbol symbol key as the first keystroke and the "-" key as the second keystroke. Continuing with the above example, the ordered key pair assignments shown in FIG. 4 include a "{" symbol character, which is identified by the reference numeral 446. The "{" symbol character 446 is typed by a combined keystroke, which includes a "[" first keystroke and a "-" second keystroke. It is additionally noted that the "-" second keystroke may also be used to type miscellaneous Ethiopic characters that are not associated with an ordered expansion of characters. For example, the character identified by the reference numeral 448 is typed using a combined character having an "r" first keystroke and an "-" second keystroke.

The assignments of the symbols associated with the two-symbol symbol key in accordance with embodiments of the present invention can be understood as a case-by-case application of a set of priorities. The first priority corresponds to the double-strike combined keystroke (column 432). The second priority corresponds to the """ key (column 434). The third priority corresponds to the "-" key (column 436). As described below, a fourth priority corresponding to the "=" key (column 437), may be needed. In assigning the symbols of a particular two-symbol symbol key, the highest available priority is given to the non-shifted symbol and the next highest available priority is given to the shifted symbol key. This symbol assignment scheme is described above in connection with two examples. In the case of the "=" (438) and "+" (440) symbols, the double-strike key (column 432) and the """ key (column 434) are available. Accordingly, the "=" symbol is assigned to the double-strike second keystroke, and the "+" is assigned to the """ second keystroke. In the case of the "[" (450) and "{" (446) symbols, the double-strike key (column 432) is available, but the """ key (column 434) is not available. Accordingly, the "[" symbol is assigned to the double-strike second keystroke, and the "{" is assigned to the "-" second keystroke. A number of other examples of the case-by-case application of the above priorities are given below.

In accordance with embodiment of the present invention, the ">" symbol key is designated as the timing disable key, the operation of which is described above. Accordingly, a double-strike combined keystroke having a ">" first keystroke and ">" second keystroke is not available for typing the ">" character. In particular, a combined keystroke having a ">" first keystroke and ">" second keystroke designates the default character assigned to the ">" key. In FIG. 4 this character is identified with the 452 reference numeral. Following the priority rules, the ">" symbol (identified with reference number 454) is assigned to the """ second keystroke (column 434) and the """ symbol (identified with reference number 456) is assigned to the "-" second keystroke (column 436).

Figure 5:
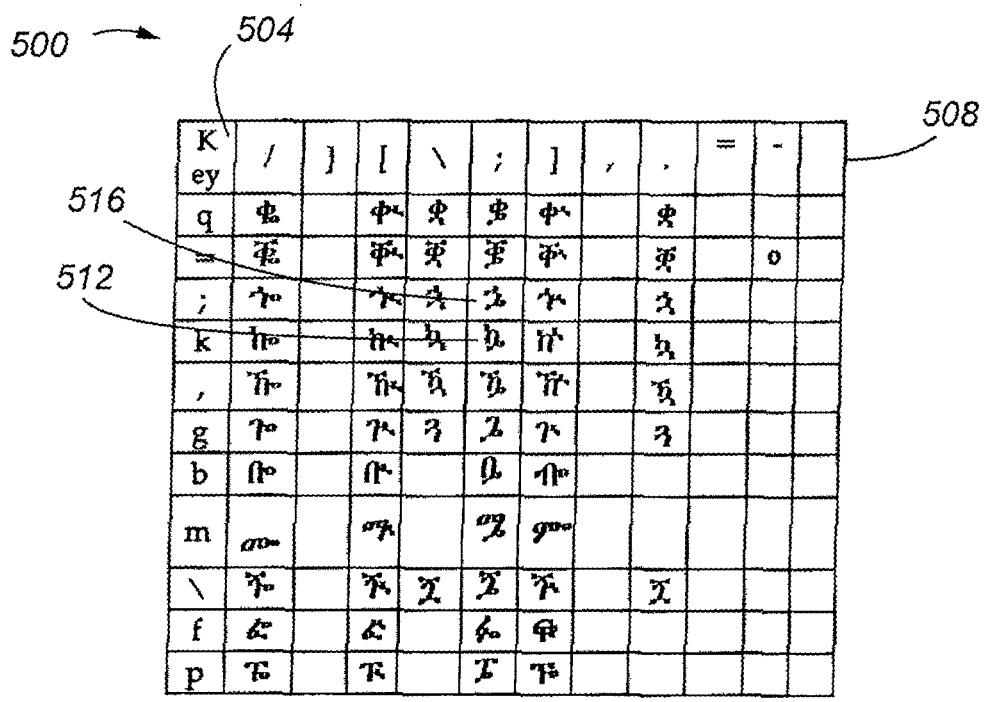
FIG. 5 is another illustration of keystroke pairs, in accordance with embodiments of the present invention.

As set forth in FIG. 5, a combined keystroke having a ";" first keystroke and a ";" second keystroke is assigned to a particular Ethiopic character. Accordingly, a double-strike combined keystroke having a ";" first keystroke and ";" second keystroke is not available for typing the ";" character. Additionally, the combined keystroke having a ";" first keystroke and a """ second keystroke is assigned to a particular Ethiopic character (identified by reference number 457). Following the priority rules, the ";" symbol (identified with reference number 458) is assigned to the "-" second keystroke (column 436) and the ":" symbol (identified with reference number 460) is assigned to the "=" second keystroke (column 437).

As a final example of the case-by-case application of the prioritized symbol key assignments, consider the symbols that are associated with the two "shift" keys themselves. In these cases, the three combined keystrokes available for symbol key assignment appear as two possible combined keystrokes because a double-strike combined keystroke is not distinct from one of the other combined keystrokes. Accordingly, the """ symbol (identified by reference number 462 appears twice in row 464, and the "-" symbol (identified by reference number 463) appears twice in row 465. Following the priority rules, the "~" symbol (identified by reference number 466) is assigned to the A-A second keystroke. As the combined keystroke having a "-" first keystroke and a """ second keystroke is assigned to particular Ethiopic character (identified by reference number 468), this combined keystroke is unavailable for assignment of the "_" symbol. As a result, the "_" symbol (identified with reference number 470) is assigned to the combined keystroke having a "-" first keystroke and a "=" second keystroke.

FIG. 4 additionally includes a stress mark generally indicated by reference numeral 474 and typed with a combined keystroke having a "f" first keystroke and a """ second keystroke. Character 474 is a ligature mark consisting of two dots that appear above the character to be stressed. The Ethiopic system is syllabic and thus every character has the potential to be stressed. However, the two dot stress symbol 474 currently in use is borrowed from western scripts and is problematic when used in connection with Ethiopic. In particular, the two dots may potentially go on top of every character and some of the characters are too big to accommodate dots. Accordingly, Dr. Aberra Molla has proposed an alternative Ethiopic stress mark, which is very close to the shape of an apostrophe and is typed after an Ethiopic character to be stressed. In accordance with embodiments of the present invention, the apostrophe stress mark may be used instead of the two dot ligature mark. FIG. 4 additionally includes an optional glyph generally identifed by reference numeral 476, which is reserved for logos, signatures and the like. This character is typed with the combined keystroke having a "]" first keystroke and a "\" second keystroke.

Turning now to FIG. 5, additional ordered key pairs, in accordance with embodiments of the present invention, are generally identified with reference numeral 500. The characters typed using ordered key pairs 500 are the characters of the Amharic, Tigrigna, Tigre and Guragie alphabets. Similar to FIG. 4, FIG. 5 includes a left-most column 504 indicating a first keystroke, and a top-most row 508 indicating a second keystroke. In accordance with embodiments of the present invention, all of these characters of the Ethiopic alphabet are typed using combined keystrokes. For example, the character identified with reference numeral 512 is typed using a combined keystroke, which includes a "k" first keystroke and a ";" second keystroke. As noted above, FIG. 5 includes a character, identified by reference numeral 516, which is typed using a combined keystroke having a ";" first keystroke and a ";" second keystroke.

Figure 6:
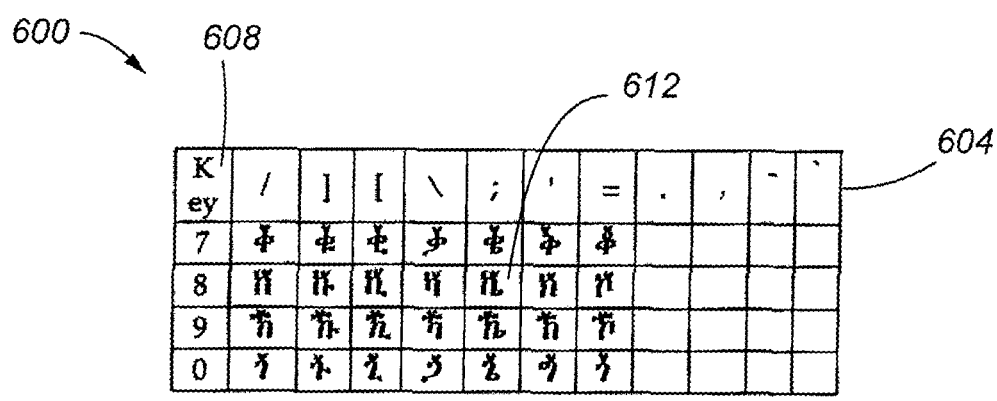
FIG. 6 is another illustration of keystroke pairs, in accordance with embodiments of the present invention.

Turning now to FIG. 6, additional ordered key pairs, in accordance with embodiments of the present invention, are generally identified with reference numeral 600. The characters, which are typed using ordered key pairs 600, belong to the Guragie alphabet. In contrast to FIGS. 4 and 5, the first keystroke is shown in the top-most row 604, and the second keystroke is shown in the left-most column 608. In accordance with embodiments of the present invention, all of these characters of the Ethiopic alphabet are typed using combined keystrokes. For example, the character identified with reference numeral 612 is typed using a combined keystroke, which includes a ";" first keystroke and a "8" second keystroke.

Figures 7, 8:
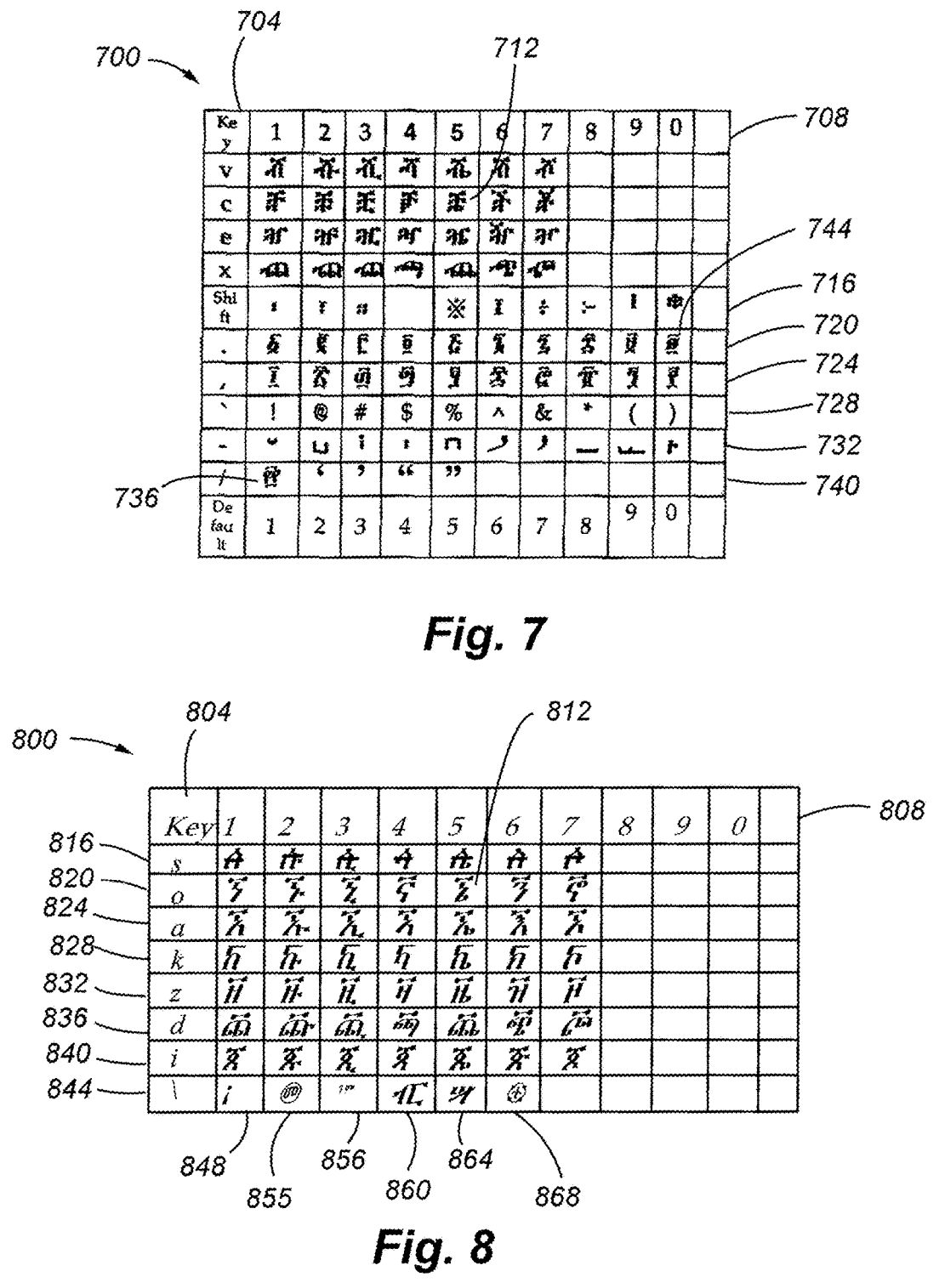

Turning now to FIG. 7, additional ordered key pairs, in accordance with embodiments of the present invention, are generally identified with reference numeral 700. The characters typed using ordered key pairs 700 include other characters of the Guragie alphabet. Additionally, the characters typed using the ordered key pairs 700 includes character of classic Ethiopic or Ge'ez.

Similar to FIG. 4, FIG. 7 includes a left-most column 704 indicating a first keystroke, and a top-most row 708 indicating a second key stoke. In accordance with embodiments of the present invention, all of these Ethiopic characters are typed using combined keystrokes. For example, the character identified with reference numeral 712 is typed using a combined keystroke, which includes a "c" first keystroke and a "5" second keystroke. The characters in row 716 are Ethiopic symbols. The characters in row 720 are Ethiopic digits. The characters in row 724 are Ethiopic numerals 10-100. The characters in row 728 are ASCII symbols, which in accordance with embodiments of the present invention are typed using a combined keystroke. The characters in row 732 are Ethiopic music symbols. The character 736 in row 740 is the Ethiopic numeral 10,000. The remaining characters in row 740 are quotation marks. The character 744 is an Ethiopic numeral zero, which was introduced by Dr. Aberra Molla in the late 80's. (Previously, Ethiopic lacked a character representing zero.)

Turning now to FIG. 8, additional ordered key pairs, in accordance with embodiments of the present invention, are generally identified with reference numeral 800. The characters typed using ordered key pairs 800 include characters of the less-widely used alphabets. Additionally, the characters typed using ordered key pairs 800 include a number of new glyphs that have not yet been accepted and coded in Unicode (discussed below). Similar to FIG. 4, FIG. 8 includes a left-most column 804 indicating a first keystroke and a top-most row 808, indicating a second keystroke. In accordance with embodiments of the present invention, all of these Ethiopic characters are typed using combined keystrokes. For example, the character identified with reference numeral 812 is typed using a combined keystroke, which includes a "o" first keystroke and a "5" second keystroke. The characters in row 824 belong to the Agew/Bilen alphabet. The characters in rows 816, 820, and 832 belong to Gamo-Gofa/Dawro while 828, 838 and 840 are Gumuz alphabets. The Geez characters have not been exhaustively presented and some variants and obsolete versions have also not been included here. An example is the Gamo-Gofa/Dawro "D" class that can be typed with a key and the numbers one to eight though not shown in FIG. 8. Other examples are the Saho additions. Modern Geez has adopted the Arabic numerals, and Dr. Molla has included more Latin symbols to the set, particularly those on the computer keyboard. It should be noted that an Amharic keyboard reduced by removing some redundant classes (to Small Amharic or Amharic S) may not have to be encumbered by rendering the complete Amharic or Ethiopic configurations and typing will thus be simpler in languages with less glyphs as there are options of not using all characters in varieties or languages where they are not needed. In such cases unnecessary rendering will be reverted optionally by loading specific keyboard (at start up or through menues) to less keyboarding methods in the reverse orders of the priorities. The character identified with reference number 848 (in row 844) is an Ethiopian sarcasm mark. The remaining characters are new additions to the Ethiopic character set introduced by Dr. Aberra Molla some years ago. The character identified with reference number 855 is an Ethiopian copyright symbol. The character identified with reference number 856 is an Ethiopian trademark symbol. The character identified with reference number 860 is an Ethiopian dollar (Birr) symbol. The character identified with reference number 864 is an Ethiopian penny (Santim) symbol. The character identified with reference number 868 is an Ethiopian registration mark.

Furthermore, the set continues to grow and the system can accommodate more characters in various methods. Examples are the use of empty typing spots in FIG. 4 with or without shifting the typing method in accordance with the rules of priorities. For instance, if the existence of characters exemplified by the ninth Ethiopic "v" character is to be verified and standardized, it would be typed by double striking the """ while """ would be typed with the key and "-" as a second key whereas "-" and "+" would type "~". Other examples of characters that when standardized could share similar characteristics are the ninth forms typed with "]", """, ",", ".", "f", "=" and "/". More examples of new eighth additions to Gamo-Gofa/Dawro are like those that could be typed with "s", "z"; Ethiopic typed with "a", "]", "w" and the Feedel "y'. Stress and stretch marks and a dot ligature positioned below or ahead of characters could be typed from within row 740 and a new glyph for number 1,000 and a couple of ligatures marks could also fit.

Figure 9:
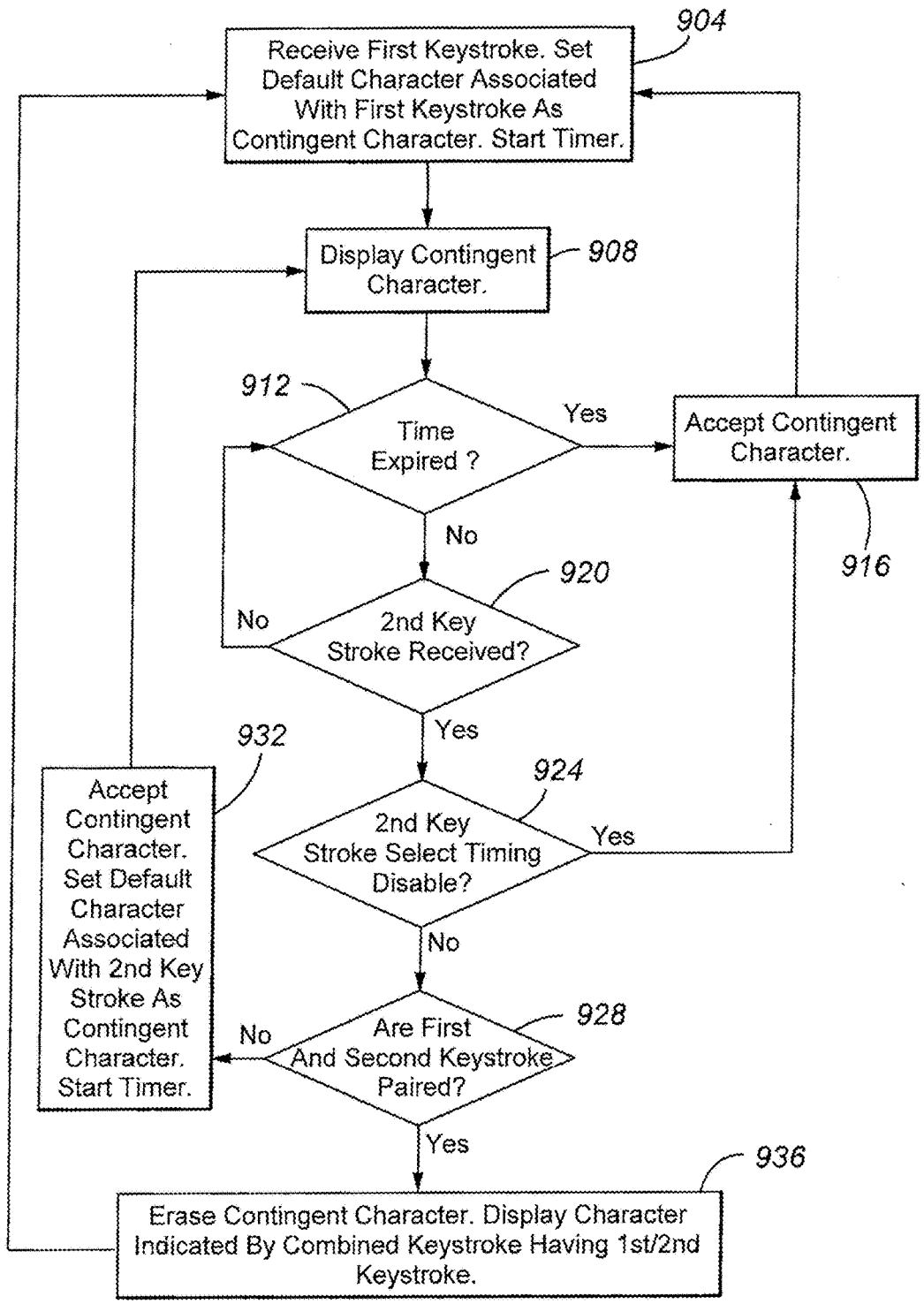
FIG. 9 is a flow chart of a method of entering Ethiopic characters, in accordance with embodiments of the present invention.
Figure 10A:
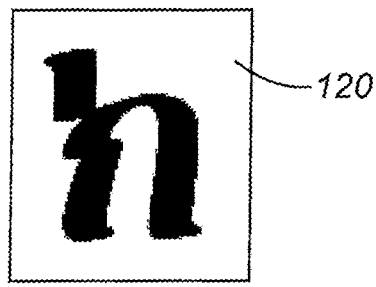
FIGS. 10A-10C are illustrations of text output, in accordance with embodiments of the present invention.

Aspects of a character entry system 100 entry system in accordance with embodiments of the present invention are illustrated in FIG. 9. At step 904, a first keystroke entered by a user through the keyboard 116 is received by the character rendering module 132. A default character associated with the first keystroke is then set or designated as a contingent character. As used herein, a "contingent character" is one that is initially rendered and may later be accepted or removed depending on subsequent events. In designating and rendering a contingent character, the character is chosen according to a predetermined default key assignment. A default key assignment 300, in accordance with embodiments of the present invention, is shown in FIG. 3, overlain on a standard keyboard. The keyboard overlay is shown herein by way of illustration, and is not meant to imply that the Ethiopic character will appear or need to appear on the keyboard 116 employed by a user. In fact, the keyboard employed by a user may be the standard QWERTY keyboard 116, which is shown in FIG. 2 for reference. Additionally, at step 904, a timer is started by the timing module 136, concurrently, as the first keystroke is latched. At step 908, the contingent character is rendered or displayed on the monitor 120. For example, at step 904, if a user strikes the key 216, shown in FIG. 2 ("k" on the QWERTY keyboard), the character rendering module will render the character 428, shown in FIG. 4. FIG. 10A illustrates the text output on the monitor 120 as it would appear following step 908.

Referring again to FIG. 9, after the first keystroke is received (step 904) and the corresponding character is rendered (step 908), a determination is made whether the timer has expired (step 912). If the timer has expired, step 916 follows. At step 916, the contingent character is accepted. After step 916, step 904 may follow, allowing the next character to be entered. If the timer has not expired, step 920 follows. At step 920, a determination is made whether a second keystroke has been received from the user. If a second keystroke has been received, it occurred within the predetermined time period. In that regard, step 924 may follow. If, at step 920, a second keystroke has been received, step 912 may follow, wherein a determination is again made whether the timer has expired.

At step 924, a second keystroke has been received by the character rendering module 132. At this point, a determination is made as to whether the second keystroke is the timing disable key. If the second keystroke is the timing disable key, no character is rendered and the previously rendered contingent character is accepted (step 916). Accordingly, the text output on the monitor continues to appear as shown in FIG. 10A. If, at step 924, the second keystroke is not the timing disable key, step 928 follows.

Figure 10B:

At step 928, a determination is made, by the correlation module 140, if the first and second keystrokes together are one of a number of predetermined ordered key pairs. Exemplary ordered key pairs which may be used in connection with the present invention are shown in FIGS. 4-8. If the first and second keystrokes together are not an ordered pair, step 932 follows. At step 932, the previously displayed contingent character is accepted and a default character associated with the second keystroke is set or designated as the contingent character. Additionally, at step 932, the timer is started again, as the second keystroke may potentially be modified by the next received keystroke. After step 932, step 908 follows, wherein the contingent character is rendered. For example, if a user strikes the key 220, shown in FIG. 2 ("e" on the QWERTY keyboard), the character designated as the contingent character at step 932 is the default character 472 as specified in FIG. 4. FIG. 10B illustrates the text output on the monitor 120 as it would appear following step 908.

Figure 10C:

If the first and second keystrokes together are an ordered pair, step 936 follows. At step 936, a combined keystroke has been received, which corresponds to the first keystroke modified by the second keystroke. Accordingly, the previously rendered contingent character corresponding to the first keystroke is removed. Then the character corresponding to the received combined keystroke is displayed. Continuing with the example above, say that a user strikes the "e" key on the QWERTY keyboard as the second keystroke, the previous character will be erased from the monitor and the character identified by reference numeral 492 (in FIG. 4) will be rendered on the monitor 120. FIG. 10C illustrates the text output on the monitor 120 as it would appear following step 936. Accordingly to the example, entry of a "k" followed by a "e" as the second keystroke. After step 936, step 904 may follow, allowing the selection of another character to be received.

Referring again to FIG. 1, the character rendering module 132 may be provided in association with a font library, such as a Unicode library 144. Unicode is a character encoding standard, which includes encoding of many languages of the world. Unicode provides a unique numerical code point for each character. The Unicode code points are divided into 17 planes, each having 65,536 ($2^{16}$) code points. Most characters are assigned to the Plane 0 (0000-FFFF) or the Basic Multilingual Plane (BMP). Other planes include Plane 1 (10000-1FFFF) or the Supplementary Multilingual Plane (SMP), and Plane 2 (20000-2FFFF) or the Supplementary Ideographic Plane (SIP). Characters are grouped together in blocks having a number of code points typically totaling some multiple of eight.

As of this writing Unicode 5.0 is the most recently promulgated standard. In Unicode 5.0, Ethiopic has been assigned three blocks in the BMP. These blocks are as follows: Ethiopic (1200-137F), Ethiopic Supplement (1380-139F) and Ethiopic Extended (2D80-2DDF). The current encoding of Ethiopic characters is not expected to change in subsequent reversions of the Unicode standard. However, it is to be noted that Ethiopic characters typed with Unicode may be expanded in later versions. As of this writing, the characters shown in FIG. 4-7 have been encoded in Unicode except for a few such as the glyphs typed with "h" and "\" and "]" and "\". The characters shown in FIG. 8 await encoding and there are some more that have not yet been publicized.

In rendering a character, the character rendering module 132 may reference the Unicode library 144. In referencing the Unicode library 144, the character rendering module 132 may include a reference to a specific code point. In accordance with embodiments of the present invention, Table 1, appended hereto, provides the Unicode code points referenced in rendering the characters shown FIGS. 4-7. For those table entries having one character, Table 1 provides the code points referenced in rendering the default characters. As mentioned above, the default characters are rendered in response to a first keystroke. Accordingly, for those table entries having one character, Table 1 includes a first keystroke (identified by its symbol on a QWERTY keyboard) and an associated Unicode code point. For those table entries having two characters, Table 1 provides the code points referenced in rendering the characters associated with a combined keystroke. As mentioned above, a combined keystroke includes a first and second keystroke. Accordingly, for those table entries having two characters, Table 1 includes first and second keystroke (shown in order and identified by their symbol on a QWERTY key board.) and an associated Unicode code point. Note that the Unicode code points are given in decimal form in Tables 1.

It is noted that future revisions to Unicode may include corrections of errors. An error of which Dr. Aberra Molla is aware of is the coding of the character 448 (FIG. 4) ahead of the character typed with "m" and "-". This is contrary to the Ethiopic sorting order. Accordingly, such corrections may require changing the code points in Table 1.

An aspect of the invention is a method for typing phonetic characters in a single keystroke. When a keystroke is entered by a user in response to the first keystroke a character is rendered. That character remains stable unless a second modifying keystroke is entered within a predetermine amount of time. If the second modifying keystroke is entered within the predetermined amount of time, the first character is replaced with a second character. Furthermore, it is important to note that the second modifying keystroke which may modify the first character rendered is a subset of the available keystrokes. If a second keystroke entered is not one of the modifying keystrokes, then the first character is settled and a second character is rendered (which may be modified to a subsequent character with a second modifying keystroke within a timer). Thus, a timer is not always required. By way of example, a second modifying keystroke subset may be the vowel keys. The vowel keys may alter a first charter and render a second character. If the user types a first character, i.e. a "m" then a first character is rendered. If the user types a second keystroke, where the second keystroke is a "t", then no timer is started and a second character, which is mapped to the "t" is rendered. Thus, the timer is only needed if an immediate subsequent keystroke is a secondary keystroke that would render a secondary character. If the second modifying keystroke is not a vowel for this example, then a timer is not started. A settling keystroke, such as an apostrophe, may also settle any character with or without the involvement of the timer. Furthermore, a settling keystroke, such as apostrophe, may also be used to settle other combinations of keystrokes, for example, when a functional keystroke (such as the shift) is used in combination with a consonant, such as a "m". The apostrophe may also be used to settle the character rendered from the combination, with or without the involvement of a timer. Furthermore, the character rendered with the "shift-m" in this example, may be modified using a modifier key.

The modifier key or keys may be any key or keys in a subset of the available keys on a keyboard. By way of example, the modifier keys may be vowels, function keys (i.e. shift, tab), numbers, symbols, consonant or combinations thereof. The keyboard may be any suitable keyboard, including but not limited to a QWERTY keyboard, an abbreviated keyboard (where at least an alphabet is shown, for example the English alphabet showing at least a-z characters), or an abbreviated QWERTY keyboard (including keyboards used for a cellular device, tablet or the like). Other examples of abbreviated keyboards include the Dvorac keyboard. In some embodiments, the abbreviated keyboard may include the numbers within the keyboard as separate keys. In other embodiments, the abbreviated keyboard may not include all of the symbols on a single displayed page. In some embodiments, a combination of a keyboard without numbers as separate keys and a keyboard without all of the symbols displayed on one page may be used. Some embodiments may include features from other keyboards. In some embodiments, the keyboard may include all of the alphabetic keys, but may not include all or any of the numbers or all or any of the symbols. Specifically excluded from the list of suitable keyboards is a keyboard associated with the number pad on a traditional phone, discussed for example in U.S. Pat. No. 5,339,358 to Danish. On virtual keyboards, the number of keys may be 10 columns of keys by 10 rows of keys.

The method may be used on a computer, a laptop, a cellular device, a tablet or the like, and one skilled in the art would understand that the keyboard may be altered in order to fit space requirements allowed by a device.

In an embodiment of the invention, a user may stop the timer by entering a settling key. The settling key may be any determined key, but in some embodiments, it may be an apostrophe, a tilde, a number, a letter, a functional key, or another key or keys.

It is important to note that the method of the invention renders a character without the need of a timer. Only certain keys will alter a first character by removing it and rendering a second character. When non-modifying keys are entered, the first key is settled and a second character will appear. However, the first keystroke does not require the second keystroke to settle if the second keystroke is not a modifying key. The second character may be altered with a second keystroke within a timer period, or it can be settled with a settling key, or it may be settled by a non-modifying keystroke, and so on.

By way of example only, a user may enter a "t" and the "ት" character would be rendered. Within a set timer, an "e" keystroke is entered and the "ት" character changes to "ቴ", and this key is settled so if "e" keystroke is entered (which in this example is a modifying key), the "ት" first character remains and a second character "ኡ", which is associated with the "e" is rendered. In another example, a user may enter "ት" the "t" and the "ት" character would be rendered. Within the timer, the user again enters a "t" keystroke, which in this example is not a modifier key. A second "ት" character is rendered next to the first character. Thus, two "ትት" characters are rendered. Now, if the "e" keystroke is entered within the time period, the second "ት" character is modified to render the "ቴ" character. If, however, the "e" character is entered outside of the timer, then a third character "ኡ" is rendered and the first two "ት" "ት" characters are settled and cannot be changed with a keystroke.

The invention allows, for example, the user to render two independent characters, as well as characters generated with a combination of keystrokes. In other words if one types "ት" with one "t" keystroke and "ኽ" with "e" keystroke, one can only type "ቴ" with "te" combination keystrokes. Similarly, if one types "ፐ" with one "Shift t" keystrokes and "ኽ" with "e" keystroke, one can only type "ጤ" with "shift-t-e" combination keystrokes. The invention uses time as a simple method to allow the typing of independent characters as well as the rendering of a character from the combination keystrokes.

The method may be used for extending ASCII characters. By way of example, the invention may be used for any language alphabet (Arabic, Russian, Greek, Latin, etc.).

It is also possible to type English from within an Ethiopic system without the need to deactivate the Ethiopic mode. Another advantage of this typing method is to make it easy to add English symbols of the keyboard without remembering the prioritized Ethiopic method. Example"1l" may be used to type symbols such as "slash" or "/".

Unlike methods currently available, the method of the invention does not require that a character that will be altered be highlighted first, or that the highlighting be removed in order to render an additional character. In addition, the characters typed using the method of the invention are settled, and cannot be changed as used in the SERA method.

In still other embodiment, additional sets of characters, for example characters from another language or additional characters from the base language, may be accessed by using the subset of keys, for example the function keys—"Alt", "Ctrl", "Shift", "Tab" and the like or a combination of the subset of keys or a repeated subset of keys. By way of example, the Ethiopic characters may be on the base keyboard. English characters may be accessed by pressing a modifier key (such as shift) in order to type characters in English. Combinations of the modifier keys may be used in order to access different language characters. For example, the Shift and Alt keys, whether pressed simultaneously or in succession, may be used to render an Arabic keyboard. In another embodiment, the base language may be Ethiopic. When a function key is pressed, additional characters of the Ethiopic language may be accessed. The additional letter may be further modified using the timer, the modifier keys and/or the settling keys. Thus, the user may access additional characters in the same language, or a different language using the function keys. The availability of a key may also depend on the keyboard, for example shift on cell phones may not be as easily available as compared to computers. Any combination or number of combinations of the function keys may be used. Thus, different language characters or additional characters from the same language may be accessed with ease. It is even possible to use the system in ligated Amharic or Ethiopic parts.

In another embodiment as in cell phones with abbreviated keyboard there may be a limited number of available characters on a first page, for example only 26 characters may be accessible on a first page of a cell phone keyboard. The first page may have the 26 English characters, a-z, and a function key, such as a shift key. The shift keystroke may bring up the capital letter A-Z, or the numeric values 0-9, or rendering the shift key more than once may bring up a third page with symbols. The default uses one keystroke each while the ones under Shift require two keystrokes each. The availability of many characters may be increased by splitting characters among different pages. By way of example, one page, two pages, three pages, four pages or five pages or more pages may be provided.

In other embodiments, a special modifier key may be used in order to access different embodiments of the similar phonetic sound. By way of example, in Ethiopic, the "q" sound is embodied in five varieties, each with a slightly different sounding "q" sound. It would follow logic that a user may want these characters to all fall on the "q" key or key or keystroke to render "ቀ" with Shift "q", "ቄ" with "qqr", "ቒ" with "Shift" "qr", "ቐ" with "q,r" or "qgr" and "ቔ" with "qwr" or "q.r", etc. involve the 'q' key. Other equipment such as iPhone or Android cell phones can use the alphabet character and symbols. By way of example, a QWERTY keyboard can fit on an iPad.

The invention allows for different varieties of characters using the same base keystroke using one, two, three, or more keystrokes. The one and two keystroke method has also been discussed above. The three keystroke method utilizes a third keystroke in order to access other varieties of the "g" sound just like the examples for "q". By way of example, the following letters, "ገ", "ጉ", "ግ", "ጎ" and "ጐ" have slightly different five "g" sounds. They can be accessed by "G", "ggr", "Gr", "g,r" and "gwr", respectively. In an abbreviated keyboard, for example on a cell phone, the comma or period can be replaced by other letters like "ፀ" and "ኘ". Similarly there are five "q" varieties and pressing "q" types "ቀ" with the one keystroke method and the apostrophe as an optional disable keystroke. Shift "q" types the key name, "ቀ" similar to the capital "Q" rendered for English when the shift and "q" are rendered. This is an example of typing a character with two keystrokes and does not involve timing and settling key. The shift key can be replaced with a single "Tab" key as a second key to the default and Ethiopic can be typed with the default keys without involving the positions of the capital letter characters.

Third keystrokes add more power to Ethiopic typing especially with fewer keys. Both timing and/or settling could come in to functionally with a third key. An embodiment of this invention may be the use of typing a character with two keystrokes, with or without including the third keystrokes in the mix. Typing a character with a shift and a key, as in typing "Q" and rendering "ቀ" is different from the one involving two keys as in typing "ቃ" with "q" and "a" or typing "ኣ" with "a" and "a" fast or "ኣ" "ኣ" with slow "aa" typing. It is also different from typing "ቀ" with "q" and "r" or rendering "ቀ" with "qq" by using the second "q" as a disable key. The feature of typing a character with two keystrokes along with the power to change after it is typed is beyond the purpose of using it for English. These are then modified with third keystrokes. In cell phones fast typing comma and "q" or "zq" within the timeout can type the number one from the default screen. Similarly "period" "q" or "qz" can type the Euro symbol by accessing the fourth cell phone screen from the first or default position. This can now be expanded to three keystrokes.

There are different usages of the three keystroke method that expands the power of the keyboard to render more characters with the invention. The basic form involves the 47 keys in the lower position. In this form, the combined use of a Shift with the default single keys is the typing of a character such as "ቀ" with Shift "q". The character "ቀ" accessed by pressing "Shift" and "q" may be followed by an "r" where "r" is the modifier key to retrieve first order Geez characters. This character may be modified with a modifier keystroke within a set period of time, settled by pressing a non-modifier key and rendering an additional character (which may itself be modified) or by pressing the settling keystroke to stop the timer. Other varieties may be accessed with other special modifying keystrokes. Each character can then be settled, using the timer, second non-modifying keystroke or the settling keystroke, or modified using a modifying keystroke. In another example, the character "ቒ" may be rendered by entering "Q" followed by "y". The special modifying keys may be a function key or may be designated by the user or program. By way of example, a double "q" example the two keystrokes may type one "ቀ" where the second is a timer disabling keystroke. The double "q" may render one "ቀ" or two "ቀ"s if not combined as in the shifted key typing. The double "q" key typing can use a third key (e.g. "r") to generate a single character, "ቄ". Similarly "Qr" typing may generate "ቒ" or two new characters, "ቀ" and "ር". The typing of "ቔ" with "qwr" is also different from typing "ቔ" with "qwa" in their relationships with the timeout. The typing of "qwr" generates the one character when typed within the timeout while three characters are generated outside the timeout or when the disable key is used, if necessary, to limit the time. On the other hand, "qwa" types "ቀ" and "ɑ" and "ኣ" if the timeout between the "w" and the "a" typing is allowed to lapse or the disable key is used. Similarly the typist has the option to use the "wa" part of the "qwa" to render "ቘ" by typing them before the time between the "w" and "a" expires. Alternatively, "ው" and "ኣ" can be typed with the disable key or after the second timeout has expired, but using the "w" and "a" keystrokes, respectively. Typing the "q" followed by the "w" renders the "ቀ" only as the application is waiting for the third keystroke. If the "w" was struck before the first timeout expired, the "w" settles the "ቀ". If the time has expired the "ው" will show up. The "ው" in turn could be changed to a "ዋ" if the third keystroke came before the time expired. If the time has expired on the second keystroke, the "a" would generate an "ኣ". In those cases where three keystrokes (qwr, qwa) are involved and they are not to be used to render a character, the second keystroke (w) also may double as a disable key for the first "ቀ" and has to be typed again (as "ww") to generate "ው". It is also possible to settle the "ቀ" by another "ቀ". This is because the "w" is waiting to settle the first if the third does not show up. However, the timeout starts all over again for the second keystroke "ው" after it is struck. The "ቀ" can also be settled with the disable key.

In another embodiment of the invention, multiple timers may be used. The first timer may be the timer between the first keystroke and the second keystroke, and the second timer may be a timer between the second keystroke and the third keystroke. In other embodiments, where the number of keystrokes has been increased, the number of timers may also increase so that there are timers between each of the keystrokes and at the end of the keystroke. The number of timers may be one less than the number of keystrokes.

Another aspect of the invention is a method of typing phonetic characters utilizing a modifier key. When using the modifier key, the first character is changed to a second character. The use of the modifier key is best explained with an example. When an individual wants to render a character for the keystrokes "shift w", the user can instead engage the "Caps Lock" (i.e. the modifier key). The user may then either use a secondary key to change the first character to a second character, or use the settling key or timer to settle the first character.

Another aspect of the invention is that when 1, 2, 3 or more timeouts are generated, the typing of the last timer stops all the timeouts. This feature can be terminated by breaking the process with other uninvolved keys such as space bar. In multiple keystrokes striking the second character ends the first time only as the second timer starts with striking the second character. This second timer will continue to the end of the designated time unless it is terminated by the third keystroke. Thus, the time between keystrokes may vary as may the duration of a timer.

Figure 12:
FIG. 12 illustrates an example of a default keyboard for a cellular phone, tablet or computer.

An aspect of the invention allows for a two keystroke method on a cellular phone, a tabular device, or other similar device. By way of example, a cell phone keyboard presents the users with a limited number of available characters due to the lack of space available on a phone. A full keyboard, including letters and numbers cannot all be accessed on the default abbreviated keyboard. An aspect of the invention is a two keystroke method with a timer. A first character is rendered in response to a first keystroke. The first character is modified to a second character if a second modifying keystroke is entered within a predetermined period of time. However, the first character is settled if a second non-modifying keystroke is entered, or if a settling keystroke is entered. FIG. 12 illustrates an example of an abbreviated keyboard for use with the Ethiopic characters, though it is understood that other abbreviated keyboards or character assignments could be used without deviating from the present invention.

In a different claim part of the invention, the Shift position is passive or in its second keystroke position as in English key typing. Its involvement in a two-keystroke method is different in the computer environment since the Shift cannot be differentiated as a separate key and used as a combined key. The two keystroke activities are completely new compared to the generation of one character from two as in claim 1. This new one involves the use of the two keystrokes as new first keystroke and generation of characters with a third key. Thus the two keystrokes generate a character on a basis for the new claim to generate characters on their own and then move on with the option to generate more with more keystrokes. They may generate 1, 2, 3 or more characters from 2, 3 or more keystrokes. This claim is repeated with 4 or more keystrokes that in turn uses claims 1 and 2. The three keystrokes may complete the activities, but the 4$^{th}$ could change the 3rd and so on. The more characters are typed with combinations the lesser the number of keys required making the A to Z keys of cell phones effective to use with more characters. The system is more powerful than that of the regular English keyboard system. For instance using the "a" and "e" keys alone and with one and two keystrokes alone one can type characters with one or two characters as solitary or two character potential words resulting in "አ", "አአ", "ኣ", "ኤ" "ኸ", "ኸኸ", "ኽ" "ኼ", "አኸ" and "ኸአ" 14 glyphs. With regular two keystrokes one can type only "አ" "ኣ", "ኤ", "ኸ", "ኽ" and "ኼ" 6 glyphs. With three or more timed keyboarding novel invention this increases the number and efficiency. With regular two keystroke methods a third keystroke interfere with two-keystroke methods. All characters may not follow the same rule and exception may have to be ignored if disadvantageous. (Example some double strike may interfere with double typing.)

Just as one, two, three and more keystrokes may generate one character, they may generate more characters. This is like generating the fake Amharic typewriter pieces as independent characters or using the timeout to ligate them with fewer keystrokes. This is an example of where one, two or more keystrokes generate an Ethiopic word and these are settled with the timeout or a process involving another like a key or the like.

An advantage of the invention is that redundant characters are eliminated by assigning most of the characters to a vowel key. Thus, the method is more efficient than those where the redundancy is not removed.

Another aspect of the invention is an example where Ethiopic numerals can be used for mathematical and other purposes like a computerized calendar because of the lack of the zero number, but was invented when the Ethiopic characters were computerized. It is thus possible to use the Ethiopic digits of zero to nine instead of the Arabic numerals. The numbers can be part of the first or second font typed with one or two keystrokes.

Another aspect of the invention is a computer entry of characters of a phonetic language having a number of characters exceeding or below the number of keys available on a standard computer or cell phone keyboards. FIG. 11 is the Ethiopic Unicode character set.

The various keyboard figures illustrate different exemplary embodiments of keyboards for use with the invention. These keyboards may be fixed or may be virtual keyboards. FIG. 12 illustrates an example of a default keyboard for a cellular phone, tablet or computer. FIG. 12 is an example of a default keyboard for use on an iPhone cellular device. FIG. 12 also illustrates the highlighted character function of the invention. By way of example, when the "s" keystroke is pressed, potential secondary characters are highlighted for the user to determine if a second character is desired based on the second keystroke. Both vowels are shown highlighted, as well as other characters in FIG. 12. One skilled in the art would understand that other secondary keystrokes besides vowels or the particular keystrokes shown in FIG. 12 may be available to the user. For instance, striking "0" and moving on to "r" renders the Ethiopic hundred numeral.

Figure 13:
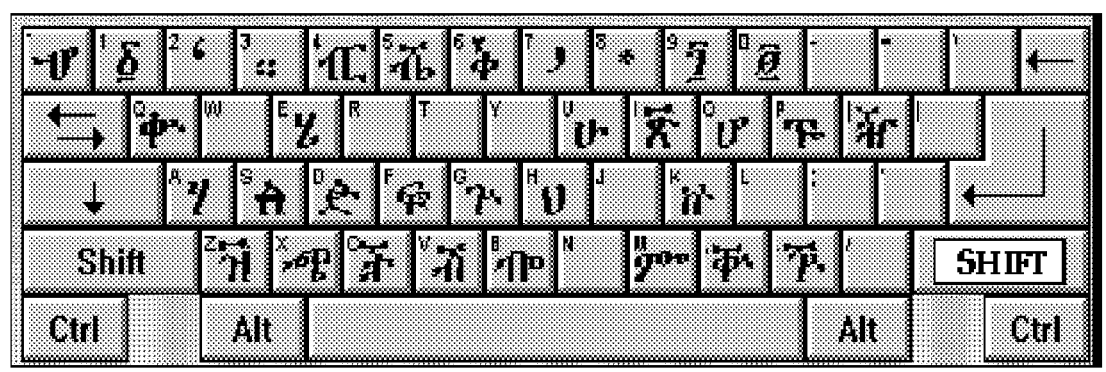
FIG. 13 illustrates a page on a keyboard for use on a computer, cellular phone or other device where minority languages are represented.

FIG. 13 illustrates a page on a keyboard for use on a computer, cellular phone or other device where minority languages are also represented. The minority language characters illustrated in FIG. 13 are characters that may be mapped to separate keystrokes from the primary characters. Both the primary and minority language characters may be rendered with two keystrokes from the same default keyboard. For example, the Amharic, Guragie and Gumuz language characters are represented by "ሞ" on the "x" key while the Agew/Bilen language characters "ኾ" and "ኻ"

share the "period" key with "፟". FIG. 13 is also to show the systematic use of more than ten varieties of glyphs with the ten numeral keys.

Figure 14:
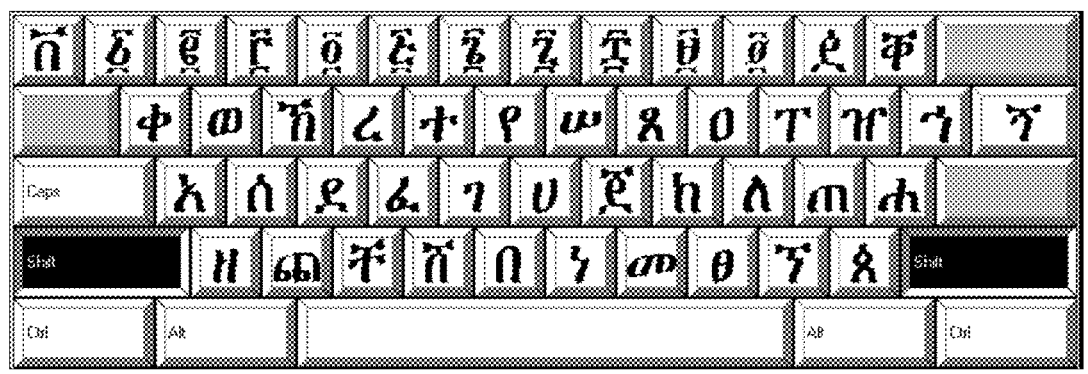
FIG. 14 illustrates another example of characters mapped on a keyboard for use on a computer, cellular phone or other device.
Figure 15:
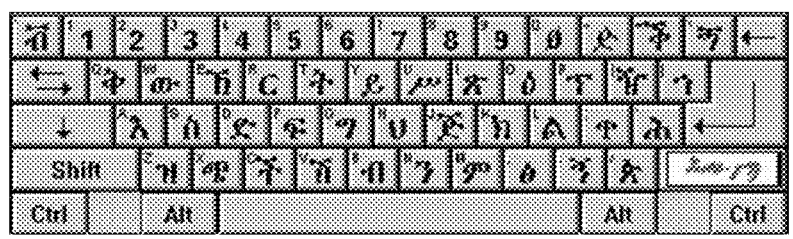
FIG. 15 illustrates exemplary characters mapped for the default keyboard where a single keystroke is rendered.
Figures 16, 17:
FIG. 16 illustrates exemplary keystroke mapping that illustrates characters that may be rendered when a particular keystroke or keystroke combination is rendered.
FIG. 17 illustrates an exemplary keyboard when the shift key is engaged.

FIG. 14 illustrates another example of characters mapped on a keyboard for use on a computer, cellular phone or other device. For example, the characters illustrated in FIG. 14 are rendered when the shift key is engaged. FIG. 15 illustrates exemplary characters mapped for the default keyboard where a single keystroke is rendered. The keyboard illustrated in FIG. 15 may be on a computer, cellular phone or other device. FIG. 16 illustrates exemplary keystroke mapping that illustrates characters that may be rendered when a particular keystroke or keystroke combination is rendered. The default may be typed with two keystrokes (such as when the apostrophe is entered as the second character), though it is understood that a default character may be rendered if the timer expires without rendering a second keystroke. FIG. 16 illustrates a variety of characters rendered using combinations with the "g" keystroke. FIG. 17 illustrates an exemplary keyboard when the shift key is engaged. The exemplary keyboard of FIG. 17 may be on any device, for example an iPad.

Figures 18, 19:
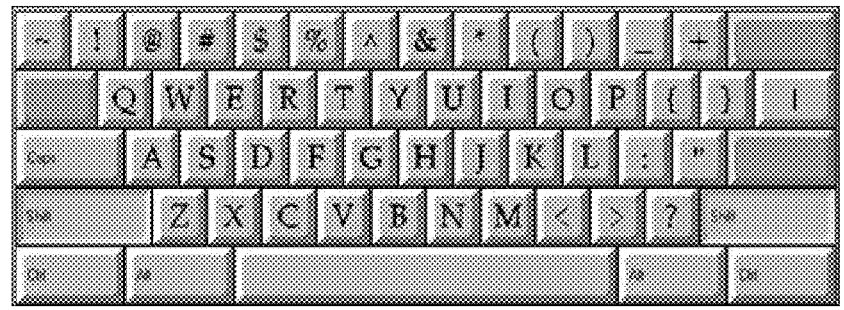
FIG. 18 illustrates a secondary language that may be available for use.
FIG. 19 illustrates exemplary key mapping for Ethiopic, and includes the Unicode for a particular character.

FIG. 18 illustrates a secondary language that may be available for use. By way of example, the primary language characters as the default keyboard may be Ethiopic, where a secondary language and characters, in this case the English alphabet, may be available as a secondary language.

FIG. 19 illustrates exemplary key mapping for Ethiopic, and includes the Unicode for a particular character. One skilled in the art would understand that the mapping may be modified without deviating from the invention. In FIG. 19, the apostrophe is illustrated as the settling key. Thus, the character under the "e'" and the character under the "e" are the same.

Figures 20, 21:
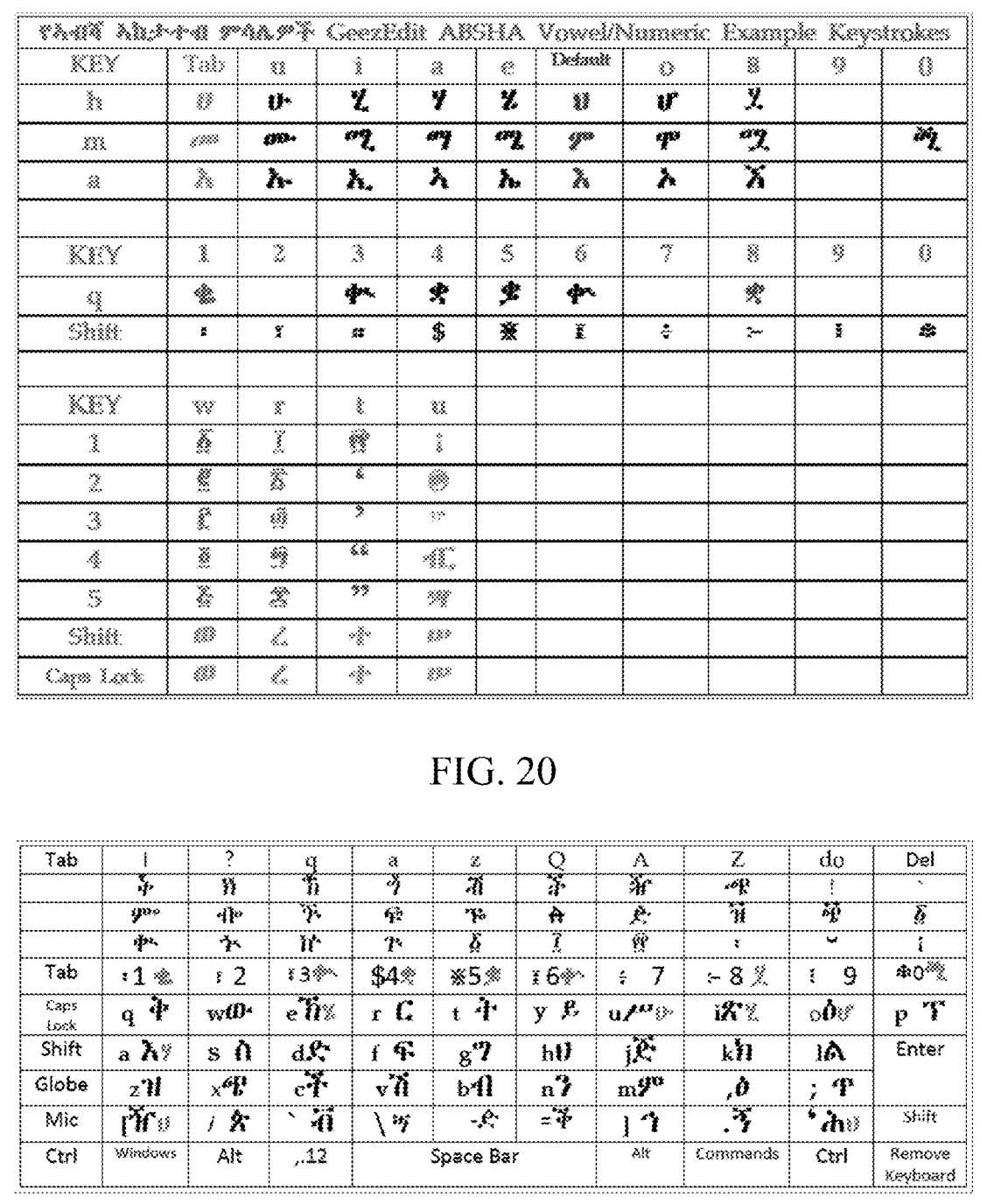

FIG. 20 illustrates exemplary keystrokes using numbers, consonants, vowels, and function keys. Characters are rendered using the combinations illustrated in the figure. By way of example only, some "u" keystrokes have not yet been recognized by Unicode and are thus font-dependent.

As illustrated in FIG. 20, the characters that are often used may be given a higher priority, and an easier to use character mapping position, much in the same way as the characters on the QWERTY keyboard are positioned based on the frequency of use of a character. This character mapping also makes it easy to break up a keyboard for different languages. FIG. 21 illustrates ten rows of characters and eleven columns of characters on an exemplary keyboard.

FIG. 22 illustrates exemplary typing using the present invention. By way of example, when "qq" is entered "l" is rendered. In another example, the "~" may be rendered by entering the "r,". The characters that are rendered may be characters that are rarely used, such as characters that are on a "third page" of a virtual keyboard.

Figures 23, 24:
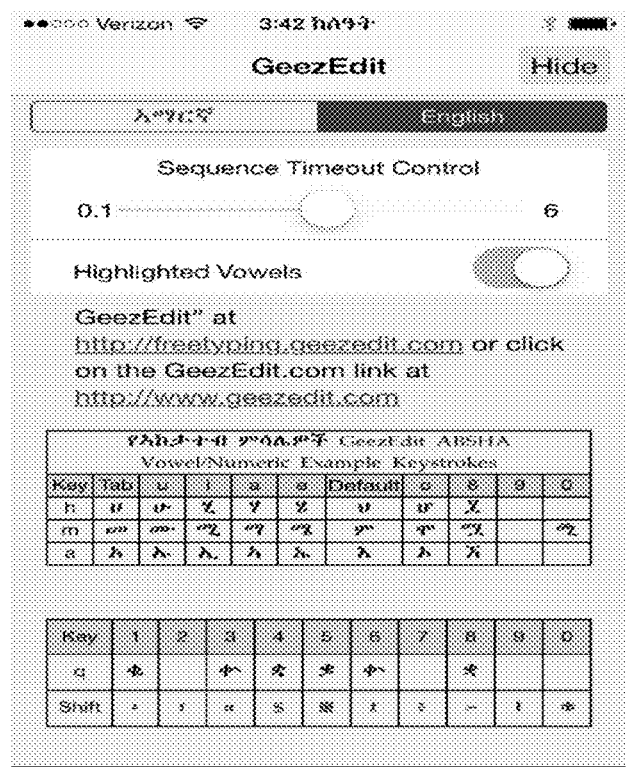
FIG. 23 illustrates a timer setup and exemplary keystrokes.
FIG. 24 illustrates another example keyboard where multiple characters may be available to a user based on the second keystroke engaged by the user.

FIG. 23 illustrates a timer setup and exemplary keystrokes. The user may alter the "timer" to the user's preference. FIG. 23 also illustrates a highlighted secondary character function, which is illustrated as vowels in this example. The user may highlight secondary keystrokes available to change a first character to a second character after the first keystroke is rendered. In some embodiments, the secondary character may be visible on the keyboard after the first keystroke is rendered allowing the user to see the available secondary characters.

Figure 25:
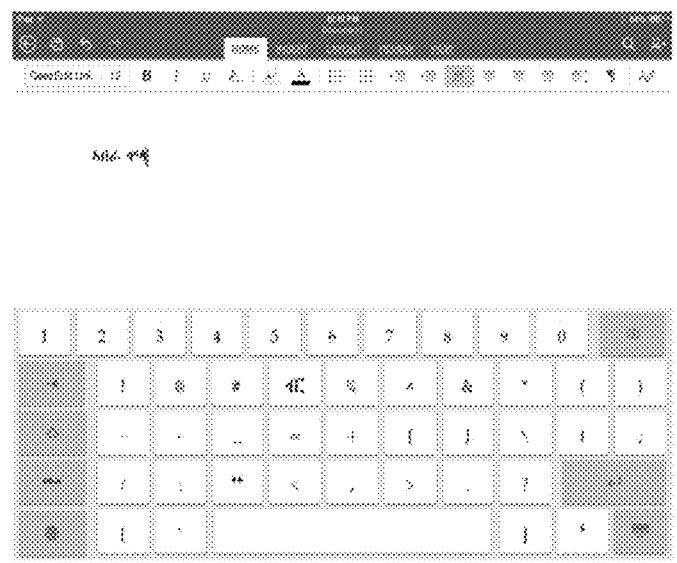
FIG. 25 illustrates a second page of a virtual keyboard using the present invention where multiple characters from different languages may be integrated on a single page.
Figure 26:
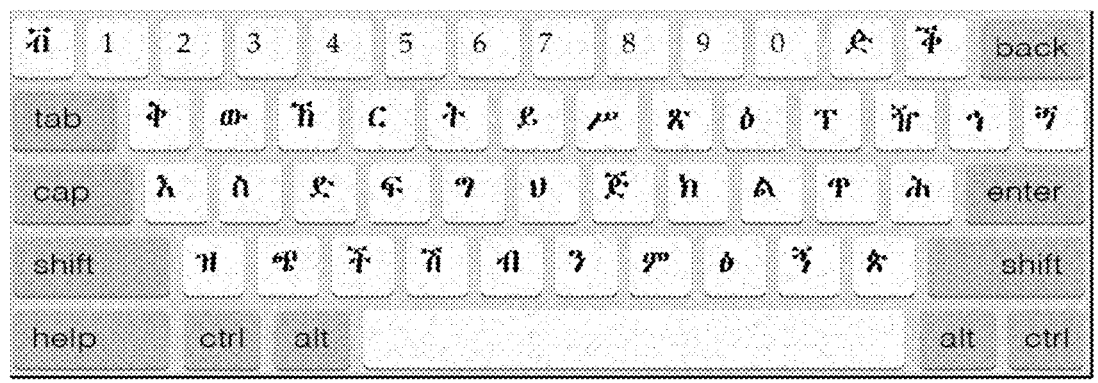
FIG. 26 illustrates an exemplary iPad default keyboard with Ethiopic characters.

FIG. 24 illustrates another example keyboard. In FIG. 24, multiple characters may be available to a user based on the second keystroke engaged by the user. By way of example, in column 8, row 3, two characters exist on a keystroke representing "፝", and "፞". The first character "፝" may be rendered by using a first combination of keystrokes (i.e. "j") while the second character "፞" may be rendered using a second combination of keystrokes (i.e. "j6"). A third character that is not shown in the table "፟" may be rendered using the combination keystrokes of "6j". Thus, one or multiple characters may be rendered while still using two keystrokes. One character may also be rendered in more than one way. Other characters may be available if additional keystrokes are entered. FIG. 25 illustrates a second page of a virtual keyboard using the present invention. FIG. 25 illustrates that multiple characters from different languages may be integrated on a single page. FIG. 26 illustrates an exemplary iPad default keyboard with Ethiopic characters. The iPad default keyboard is similar to a standard QWERTY keyboard.

TABLE 1

| Keys(s) | Unicode Code Point |
|---|---|
| '_ | 039 |
| -- | 045 |
| ' | 04629 |
| - | 04861 |
| _' | 04861 |
| " | 04629 |
| ! | 04961 |
| " | 04624 |
| # | 04962 |
| $ | 032 |
| % | 04960 |
| & | 04965 |
| ( | 04967 |
| ) | 04968 |
| * | 04966 |
| , | 04797 |
| ,' | 04797 |
| ,, | 044 |
| ,; | 04803 |
| ,/ | 04800 |
| ,; | 04804 |
| ,[ | 04805 |
| ,\ | 04803 |
| ,] | 04802 |
| ,' | 060 |
| ,0 | 04987 |
| ,1 | 04978 |
| ,2 | 04979 |
| ,3 | 04980 |
| ,4 | 04981 |
| ,5 | 04982 |
| ,6 | 04983 |
| ,7 | 04984 |
| ,8 | 04985 |
| ,9 | 04986 |
| ,a | 04795 |
| ,e | 04796 |
| ,i | 04794 |
| ,o | 04798 |
| ,u | 04793 |
| . | 04645 |
| .' | 04645 |
| .. | 046 |
| .\ | 04647 |
| .' | 062 |
| .1 | 04969 |
| .2 | 04970 |
| .3 | 04971 |
| .4 | 04972 |
| .5 | 04973 |
| .6 | 04974 |
| .7 | 04975 |
| .8 | 04976 |
| .9 | 04977 |
| .a | 04643 |
| .e | 04644 |
| .i | 04642 |

TABLE 1-continued

| Keys(s) | Unicode Code Point |
|---|---|
| .o | 04646 |
| .u | 04641 |
| / | 04925 |
| /' | 04925 |
| // | 047 |
| /\ | 04927 |
| /` | 063 |
| /0 | 11736 |
| /1 | 04988 |
| /2 | 0145 |
| /3 | 0146 |
| /4 | 0147 |
| /5 | 0148 |
| /7 | 11712 |
| /8 | 11720 |
| /9 | 11728 |
| /a | 04923 |
| /e | 04924 |
| /i | 04922 |
| /o | 04926 |
| /u | 04921 |
| : | 04736 |
| ; | 04741 |
| ;' | 04741 |
| ;- | 059 |
| ;. | 04747 |
| ;/ | 04744 |
| ;; | 04748 |
| ;[ | 04746 |
| ;\ | 04747 |
| ;] | 04749 |
| ;` | 04743 |
| ;= | 058 |
| ;0 | 11740 |
| ;7 | 11716 |
| ;8 | 11724 |
| ;9 | 11732 |
| ;a | 04739 |
| ;e | 04740 |
| ;i | 04738 |
| ;o | 04742 |
| ;u | 04737 |
| ? | 04920 |
| @ | 04963 |
| [ | 04917 |
| [' | 04917 |
| [- | 0123 |
| [[ | 091 |
| [\ | 04919 |
| [` | 11665 |
| [0 | 11738 |
| [7 | 11714 |
| [8 | 11722 |
| [9 | 11730 |
| [a | 04915 |
| [e | 04916 |
| [i | 04914 |
| [o | 04918 |
| [u | 04913 |
| `\ | 04631 |
| -\ | 04863 |
| \' | 04893 |
| \ | 04893 |
| \- | 092 |
| \. | 04895 |
| \/ | 11667 |
| \; | 11669 |
| \[ | 11668 |
| \\ | 04895 |
| \] | 11670 |
| \` | 0124 |
| \0 | 11739 |
| \7 | 11715 |
| \8 | 11723 |
| \9 | 11731 |
| \a | 04891 |
| \e | 04892 |
| \i | 04890 |

TABLE 1-continued

| Keys(s) | Unicode Code Point |
|---|---|
| \o | 04894 |
| \u | 04889 |
| ] | 04821 |
| ]' | 04821 |
| ]] | 093 |
| ]` | 0125 |
| ]0 | 11737 |
| ]7 | 11713 |
| ]8 | 11721 |
| ]9 | 11729 |
| ]a | 04819 |
| ]e | 04820 |
| ]i | 04818 |
| ]o | 04822 |
| ]u | 04817 |
| `` | 04964 |
| `_ | 04856 |
| `' | 034 |
| `` | 04717 |
| `` | 04717 |
| `, | 11661 |
| `- | 0126 |
| `[ | 11665 |
| `\ | 04719 |
| `` | 096 |
| `0 | 041 |
| `1 | 033 |
| `2 | 064 |
| `3 | 035 |
| `4 | 036 |
| `5 | 037 |
| `6 | 094 |
| `7 | 038 |
| `8 | 042 |
| `9 | 040 |
| `a | 04715 |
| `e | 04716 |
| `i | 04714 |
| `o | 04718 |
| `u | 04713 |
| { | 04912 |
| \| | 04888 |
| } | 04816 |
| ~ | 04712 |
| + | 04688 |
| < | 04792 |
| = | 04693 |
| =' | 04693 |
| -= | 095 |
| =. | 04699 |
| =/ | 04696 |
| =; | 04700 |
| =[ | 04698 |
| =\ | 04699 |
| =] | 04701 |
| = | 043 |
| == | 061 |
| =0 | 11742 |
| =7 | 11718 |
| =8 | 11726 |
| =9 | 11734 |
| =a | 04691 |
| =e | 04692 |
| =i | 04690 |
| =o | 04694 |
| =u | 04689 |
| > | 04640 |
| 0 | 048 |
| -0 | 05017 |
| '0 | 11741 |
| 1 | 049 |
| -1 | 05008 |
| 2 | 050 |
| -2 | 05009 |
| -3 | 05010 |
| 3 | 051 |
| -4 | 05011 |
| 4 | 052 |

TABLE 1-continued

| Keys(s) | Unicode Code Point |
|---|---|
| -5 | 05012 |
| 5 | 053 |
| -6 | 05013 |
| 6 | 054 |
| -7 | 05014 |
| 7 | 055 |
| '7 | 11717 |
| 8 | 056 |
| '8 | 11725 |
| -8 | 05015 |
| -9 | 05016 |
| 9 | 057 |
| '9 | 11733 |
| A | 04768 |
| a | 04773 |
| a' | 04773 |
| -a | 04859 |
| 'a | 04627 |
| a\ | 04775 |
| a` | 11658 |
| aa | 04771 |
| ae | 04772 |
| ai | 04770 |
| ao | 04774 |
| au | 04769 |
| B | 04704 |
| b | 04709 |
| b' | 04709 |
| b/ | 04996 |
| b; | 04998 |
| b[ | 04997 |
| b\ | 04711 |
| b] | 04999 |
| b` | 11653 |
| ba | 04707 |
| be | 04708 |
| bi | 04706 |
| bo | 04710 |
| bu | 04705 |
| C | 04728 |
| c | 04733 |
| c' | 04733 |
| c\ | 04735 |
| c` | 11655 |
| c1 | 11688 |
| c2 | 11689 |
| c3 | 11690 |
| c4 | 11691 |
| c5 | 11692 |
| c6 | 11693 |
| c7 | 11694 |
| ca | 04731 |
| ce | 04732 |
| ci | 04730 |
| co | 04734 |
| cu | 04729 |
| D | 04848 |
| d | 04853 |
| d' | 04853 |
| d\ | 04855 |
| d` | 11660 |
| da | 04851 |
| de | 04852 |
| di | 04850 |
| do | 04854 |
| du | 04849 |
| 'e | 04628 |
| E | 04832 |
| e | 04837 |
| e' | 04837 |
| -e | 04860 |
| e\ | 04839 |
| e1 | 11696 |
| e2 | 11697 |
| e3 | 11698 |
| e4 | 11699 |
| e5 | 11700 |
| e6 | 11701 |

TABLE 1-continued

| Keys(s) | Unicode Code Point |
|---|---|
| e7 | 11702 |
| ea | 04835 |
| ee | 04836 |
| ei | 04834 |
| eo | 04838 |
| eu | 04833 |
| F | 04936 |
| f | 04941 |
| f' | 04941 |
| f- | 04954 |
| f/ | 05000 |
| f; | 05002 |
| f[ | 05001 |
| f\ | 04943 |
| f] | 05003 |
| f` | 04959 |
| fa | 04939 |
| fe | 04940 |
| fi | 04938 |
| fo | 04942 |
| fu | 04937 |
| G | 04872 |
| g | 04877 |
| g' | 04877 |
| g. | 04883 |
| g/ | 04880 |
| g; | 04884 |
| g; | 04882 |
| g[ | 04883 |
| g\ | 04885 |
| g] | 04879 |
| ga | 04875 |
| ge | 04876 |
| gi | 04874 |
| go | 04878 |
| gu | 04873 |
| H | 04608 |
| h | 04613 |
| h' | 04613 |
| h\ | 0244 |
| h` | 04615 |
| ha | 04611 |
| he | 04612 |
| hi | 04610 |
| ho | 04614 |
| hu | 04609 |
| 'i | 04626 |
| -i | 04858 |
| I | 04928 |
| i | 04933 |
| i' | 04933 |
| i\ | 0245 |
| i` | 04935 |
| ia | 04931 |
| ie | 04932 |
| ii | 04930 |
| io | 04934 |
| iu | 04929 |
| j | 04869 |
| j' | 04869 |
| J | 04864 |
| j\ | 04871 |
| j` | 11662 |
| ja | 04867 |
| je | 04868 |
| ji | 04866 |
| jo | 04870 |
| ju | 04865 |
| K | 04776 |
| k' | 04781 |
| k | 04781 |
| k. | 04787 |
| k/ | 04784 |
| k; | 04788 |
| k[ | 04786 |
| k\ | 04787 |
| k] | 04789 |
| k` | 04783 |

TABLE 1-continued

| Keys(s) | Unicode Code Point |
|---|---|
| ka | 04779 |
| ke | 04780 |
| ki | 04778 |
| ko | 04782 |
| ku | 04777 |
| l | 04621 |
| l' | 04621 |
| L | 04616 |
| l\ | 04623 |
| l` | 11648 |
| la | 04619 |
| le | 04620 |
| li | 04618 |
| lo | 04622 |
| lu | 04617 |
| M | 04632 |
| m | 04637 |
| m- | 04953 |
| m' | 04637 |
| m/ | 04992 |
| m; | 04994 |
| m[ | 04993 |
| m\ | 04639 |
| m] | 04995 |
| m` | 11649 |
| ma | 04635 |
| me | 04636 |
| mi | 04634 |
| mo | 04638 |
| mu | 04633 |
| N | 04752 |
| n' | 04757 |
| n | 04757 |
| n\ | 04759 |
| n` | 11656 |
| na | 04755 |
| ne | 04756 |
| ni | 04754 |
| no | 04758 |
| nu | 04753 |
| 'o | 04630 |
| O | 04760 |
| o | 04765 |
| o' | 04765 |
| -o | 04862 |
| o\ | 04767 |
| o` | 11657 |
| oa | 04763 |
| oe | 04764 |
| oi | 04762 |
| oo | 04766 |
| ou | 04761 |
| P | 04944 |
| p | 04949 |
| p' | 04949 |
| p/ | 05004 |
| p; | 05006 |
| p[ | 05005 |
| p\ | 04951 |
| p] | 05007 |
| p` | 11666 |
| pa | 04947 |
| pe | 04948 |
| pi | 04946 |
| po | 04950 |
| pu | 04945 |
| q | 04677 |
| q' | 04677 |
| Q | 04672 |
| q. | 04683 |
| q/ | 04680 |
| q; | 04684 |
| q[ | 04682 |
| q\ | 04683 |
| q] | 04685 |
| q` | 04679 |
| qa | 04675 |
| qe | 04676 |
| qi | 04674 |
| qo | 04678 |
| qu | 04673 |
| R | 04648 |
| r' | 04653 |
| r- | 04952 |
| r | 04653 |
| r\ | 04655 |
| r` | 11650 |
| ra | 04651 |
| re | 04652 |
| ri | 04650 |
| ro | 04654 |
| ru | 04649 |
| S | 04656 |
| s | 04661 |
| s' | 04661 |
| s\ | 04663 |
| s` | 11651 |
| sa | 04659 |
| se | 04660 |
| si | 04658 |
| so | 04662 |
| su | 04657 |
| T | 04720 |
| t | 04725 |
| t' | 04725 |
| t\ | 04727 |
| t` | 11654 |
| ta | 04723 |
| te | 04724 |
| ti | 04722 |
| to | 04726 |
| tu | 04721 |
| 'u | 04625 |
| -u | 04857 |
| U | 04896 |
| u | 04901 |
| u' | 04901 |
| u\ | 04903 |
| u` | 11663 |
| ua | 04899 |
| ue | 04900 |
| ui | 04898 |
| uo | 04902 |
| uu | 04897 |
| V | 04664 |
| v' | 04669 |
| v | 04669 |
| v\ | 04671 |
| v` | 11652 |
| v1 | 11680 |
| v2 | 11681 |
| v3 | 11682 |
| v4 | 11683 |
| v5 | 11684 |
| v6 | 11685 |
| v7 | 11686 |
| va | 04667 |
| ve | 04668 |
| vi | 04666 |
| vo | 04670 |
| vu | 04665 |
| W | 04808 |
| w | 04813 |
| w' | 04813 |
| w` | 04815 |
| wa | 04811 |
| we | 04812 |
| wi | 04810 |
| wo | 04814 |
| wu | 04809 |
| X | 04904 |
| x | 04909 |
| x' | 04909 |
| x\ | 04911 |
| x` | 11664 |
| x1 | 11704 |

TABLE 1-continued

| Keys(s) | Unicode Code Point |
|---|---|
| x2 | 11705 |
| x3 | 11706 |
| x4 | 11707 |
| x5 | 11708 |
| x6 | 11709 |
| x7 | 11710 |
| xa | 04907 |
| xe | 04908 |
| xi | 04906 |
| xo | 04910 |
| xu | 04905 |
| y | 04845 |
| y' | 04845 |
| Y | 04840 |
| y` | 04847 |
| ya | 04843 |
| ye | 04844 |
| yi | 04842 |
| yo | 04846 |
| yu | 04841 |
| Z | 04824 |
| z | 04829 |
| z' | 04829 |
| z\ | 04831 |
| z` | 11659 |
| za | 04827 |
| ze | 04828 |
| zi | 04826 |
| zo | 04830 |
| zu | 04825 |

The foregoing discussion of the invention has been presented for purposes of illustration and description. The foregoing is not intended to limit the invention to the form or forms disclosed herein. In the foregoing Detailed Description for example, various features of the invention are grouped together in one or more embodiment for the purpose of streamlining the disclosure. This method of disclosure is not to be interpreted as reflecting an invention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover, though the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

The invention claimed is:

1. A method of generating characters of a phonetic language using key presses inputted on a device keyboard, comprising:
   receiving at the device keyboard a first keystroke, wherein the device keyboard is a QWERTY keyboard or a Dvorac keyboard;
   in response to receiving the first keystroke, starting a first timer, designating a first character a first contingent character, and rendering the first contingent character prior to the first timer expiring;
   if the first timer expires, accepting the first contingent character;
   if a second keystroke is received at the device keyboard prior to the first timer expiring, determining if the second keystroke is associated with one of a number of predetermined specifier keys associated with the first keystroke;
   if the second keystroke received prior to the first timer expiring is not one of the predetermined specifier keys, accepting the first contingent character and rendering a second character;
   if the second keystroke received prior to the first timer expiring is one of the predetermined specifier keys, removing the first character and rendering a third character;
   if the second keystroke is an order modifying keystroke, providing a second order group of characters and starting a second timer;
   if a third keystroke is received at the device keyboard prior to the second timer expiring, determining if the third keystroke is associated with one of a number of predetermined specifier keys associated with the first keystroke;
   if the third keystroke received prior to the second timer expiring is not one of the predetermined specifier keys, accepting the first contingent character and rendering a fourth character; and
   if the third keystroke received prior to the second timer expiring is one of the predetermined specifier keys, removing the first character and rendering a fifth character.

2. The method of claim 1, wherein the device keyboard is a cell phone keyboard.

3. The method of claim 2, wherein the cell phone keyboard is virtual.

4. The method of claim 2, wherein the cell phone keyboard is non-virtual.

5. The method of claim 1, wherein the device keyboard is a tablet keyboard.

6. The method of claim 5, wherein the tablet keyboard is virtual.

7. The method of claim 5, wherein the tablet keyboard is non-virtual.

8. The method of claim 1, wherein the third character is rendered in at least one ligated part.

9. The method of claim 1, wherein at least one of the first contingent character, the second character, and the third character is at least one of an Ethiopic zero, an Ethiopic symbol, and an Ethiopic sign.

10. The method of claim 1, wherein in response to receiving the first keystroke, the predetermined specifier keystrokes associated with the first keystroke highlight on the device keyboard.

11. The method of claim 1, wherein the predetermined specifier keystrokes are vowels.

12. The method of claim 1, wherein the QWERTY keyboard or Dvorak keyboard is abbreviated.

13. The method of claim 12, wherein the abbreviated QWERTY keyboard or Dvorak keyboard comprises at least one display page.

14. The method of claim 1, wherein rendering the first character, the second character, the third character, the fourth character and the fifth character includes referencing a Unicode font library.

15. The method of claim 1, wherein the first timer is adjustable.

16. The method of claim 1, wherein the second timer is adjustable.

17. The method of claim 1, wherein the predetermined specifier keys associated with the first keystroke represent units of speech having common consonant sound and a differing vowel sound.

18. The method of claim 1, wherein the predetermined specifier keys associated with the first keystroke include a disable key, which if received as the second keystroke, no further action is taken.

19. The method of claim 1, wherein the phonetic language is Amharic.

20. The method of claim 1, wherein the phonetic language is selected from the group consisting of Arabic, Russian, Greek, Guragie, Gumuz, Latin, Tigre, Tigrigna, Agnew, and Bilen.

* * * * *